(12) United States Patent
Hama et al.

(10) Patent No.: US 11,572,485 B2
(45) Date of Patent: Feb. 7, 2023

(54) INK SET

(71) Applicant: Seiko Epson Corporation, Tokyo (JP)

(72) Inventors: Shintaro Hama, Matsumoto (JP); Tomohiro Aruga, Matsumoto (JP); Kiyomi Kumamoto, Shiojiri (JP); Yusuke Mizutaki, Shiojiri (JP)

(73) Assignee: Seiko Epson Corporation

( * ) Notice: Subject to any disclaimer, the term of this patent is extended or adjusted under 35 U.S.C. 154(b) by 355 days.

(21) Appl. No.: 16/776,717

(22) Filed: Jan. 30, 2020

(65) Prior Publication Data

US 2020/0248024 A1 Aug. 6, 2020

(30) Foreign Application Priority Data

Jan. 31, 2019 (JP) .............. JP2019-015329

(51) Int. Cl.
| | |
|---|---|
| C09D 11/037 | (2014.01) |
| C09D 11/36 | (2014.01) |
| C09D 11/40 | (2014.01) |
| C09D 11/322 | (2014.01) |
| C09D 11/328 | (2014.01) |
| C09B 11/24 | (2006.01) |
| C09B 29/46 | (2006.01) |
| C09B 35/03 | (2006.01) |
| C09B 35/025 | (2006.01) |
| C09B 47/24 | (2006.01) |
| C09D 11/033 | (2014.01) |

(52) U.S. Cl.
CPC .............. C09D 11/40 (2013.01); C09B 11/24 (2013.01); C09B 29/3652 (2013.01); C09B 35/025 (2013.01); C09B 35/03 (2013.01); C09B 47/24 (2013.01); C09D 11/033 (2013.01); C09D 11/037 (2013.01); C09D 11/322 (2013.01); C09D 11/328 (2013.01); C09D 11/36 (2013.01)

(58) Field of Classification Search
CPC ..... C09D 11/033; C09D 11/037; C09D 11/36; C09D 11/40; C09D 11/322; C09D 11/328; C09B 11/24; C09B 29/3652; C09B 35/03; C09B 35/025; C09B 47/24; C09B 67/0033; C09B 67/0035; C09B 67/0055
See application file for complete search history.

(56) References Cited

U.S. PATENT DOCUMENTS

| | | | | |
|---|---|---|---|---|
| 7,503,967 | B2 * | 3/2009 | Matsui .................. | C09D 11/16 347/100 |
| 8,512,462 | B2 * | 8/2013 | Matsui ................. | C09D 11/328 347/100 |
| 8,741,045 | B2 * | 6/2014 | Kawaguchi ............. | C09B 35/56 106/31.5 |
| 2012/0301685 | A1 | 11/2012 | Iseki et al. | |
| 2013/0002757 | A1 * | 1/2013 | Aruga .................. | C09D 11/322 106/31.28 |
| 2016/0032125 | A1 | 2/2016 | Ohori et al. | |

FOREIGN PATENT DOCUMENTS

| | | |
|---|---|---|
| CN | 102796416 A | 11/2012 |
| CN | 105315794 A | 2/2016 |
| EP | 3533841 A1 | 9/2019 |
| JP | 2009-067833 A | 4/2009 |
| JP | 2013-010825 A | 1/2013 |
| JP | 2013-112729 A | 6/2013 |
| JP | 2017-171753 A | 9/2017 |
| WO | WO-2018-079442 A1 | 5/2018 |

OTHER PUBLICATIONS

U.S. Appl. No. 16/776,657, filed Jan. 30, 2020, Tomohiro Aruga et al.

* cited by examiner

*Primary Examiner* — Anh T Vo
(74) *Attorney, Agent, or Firm* — Harness, Dickey & Pierce, P.L.C.

(57) ABSTRACT

An ink set includes a pigment ink, containing a pigment, and a dye ink containing the compound represented by formula (y-1) below or a salt thereof.

[Chem. 1]

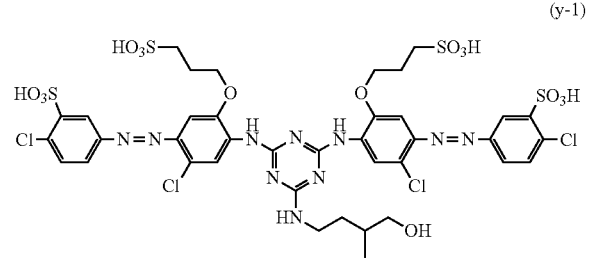

9 Claims, No Drawings

INK SET

The present application is based on, and claims priority from, JP Application Serial Number 2019-015329, filed Jan. 31, 2019, the disclosure of which is hereby incorporated by reference herein in its entirety.

BACKGROUND

1. Technical Field

The present disclosure relates to an ink set.

2. Related Art

In ink jet technology, types of ink sets are used to record images. Each ink in an ink set contains multiple ingredients and, to produce an image in a desired color, contains a colorant, such as a dye or pigment.

An ink set is made with multiple inks that contain colorants in different colors. Alternatively, an ink set may be composed of multiple inks that contain different types of colorants. For example, International Publication No. 2018/079442 discloses an ink set that includes a water-based pigment ink and a water-based dye ink.

In ink jet recording with an ink set that includes pigment and dye inks, however, the two inks can come into contact with each other, for example as a result of the cleaning of the recording head. The contact can affect the ejection performance of the recording head by destroying dispersion in the inks. A possible cause is that ions in the dye ink influence the dispersion of the ingredients of the pigment ink.

International Publication No. 2018/079422 proposes reducing the concentration of ions in the dye ink. Reducing the ionic concentration of a dye ink, however, requires reducing the dye content; this approach therefore has a limitation in terms of color strength. A possible solution to this is to improve the color strength by complicating the structure of the dye molecule, but this may require a functional group that undergoes ionic dissociation, such as the carboxyl or sulfonyl group, to maintain the dye's own solubility. This solution therefore does not necessarily contribute to reducing the concentration of inks in the dye ink.

The distribution of a pigment ink's ingredients is not only influenced by ions but governed by many factors, such as pH, relative permittivity, the pigment's diameter, and intermolecular forces. When adjusting dispersion in ink, therefore, it is insufficient to focus only on the concentration of ions.

Overall, there is a need for an ink set in which the ingredients of a pigment ink remain in good dispersion even when the pigment ink comes into contact with a dye ink.

SUMMARY

A form of an ink set according to an aspect of the present disclosure includes a pigment ink, containing a pigment, and a dye ink containing the compound represented by formula (y-1) below or a salt thereof.

[Chem. 1]

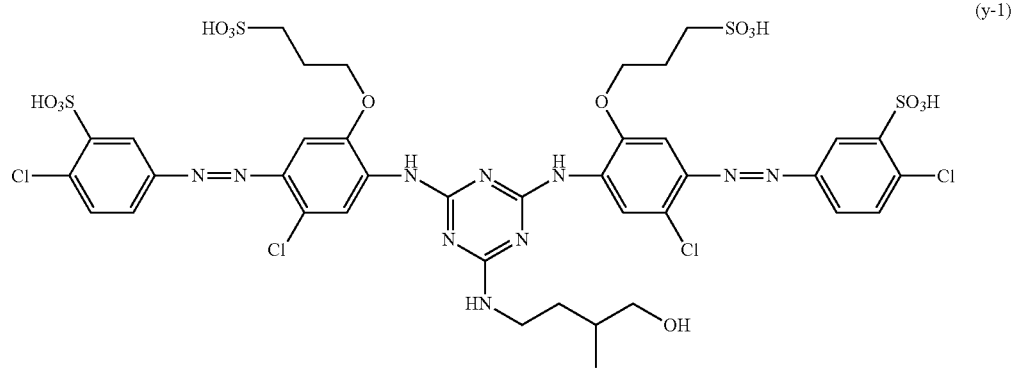

(y-1)

In the above form of an ink set, the percentage of the compound represented by formula (y-1) above or salt thereof in the dye ink may be 60.0% by mass or more and 90.0% by mass or less of the total amount of dyes in the dye ink.

In any of the above forms of an ink set, the dye ink may further contain the compound represented by formula (y-2) below or a salt thereof.

[Chem. 2]

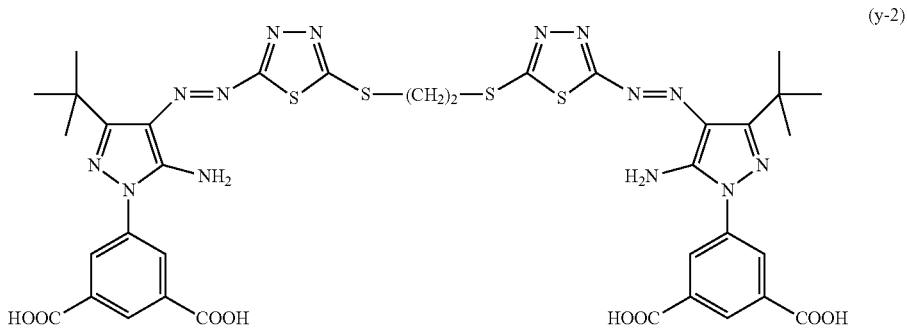

(y-2)

In any of the above forms of an ink set, the dye ink may further contain the compound represented by formula (y-3) below or a salt thereof.

[Chem. 3]

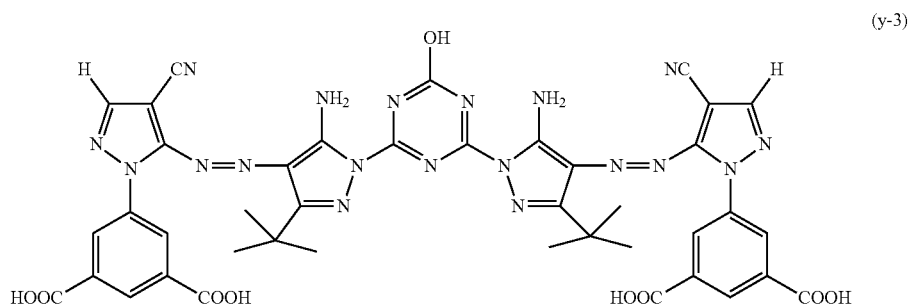

(y-3)

In any of the above forms of an ink set, the dye ink may further contain the compound represented by formula (y-4) below or a salt thereof.

[Chem. 4]

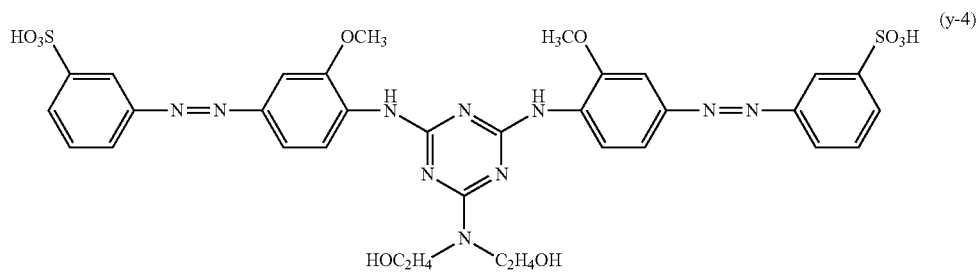

(y-4)

In any of the above forms of an ink set, the dye ink may further contain C.I. Direct Yellow 86.

In any of the above forms of an ink set, the dye ink may further contain C.I. Direct Yellow 132.

In any of the above forms of an ink set, the dye ink may contain an organic solvent having an sp of 12.5 or less in an amount of 5.0% by mass or more.

In any of the above forms of an ink set, the ink set may further include a cyan ink containing one or two or more selected from the compound represented by formula (c-1) below or a salt thereof,

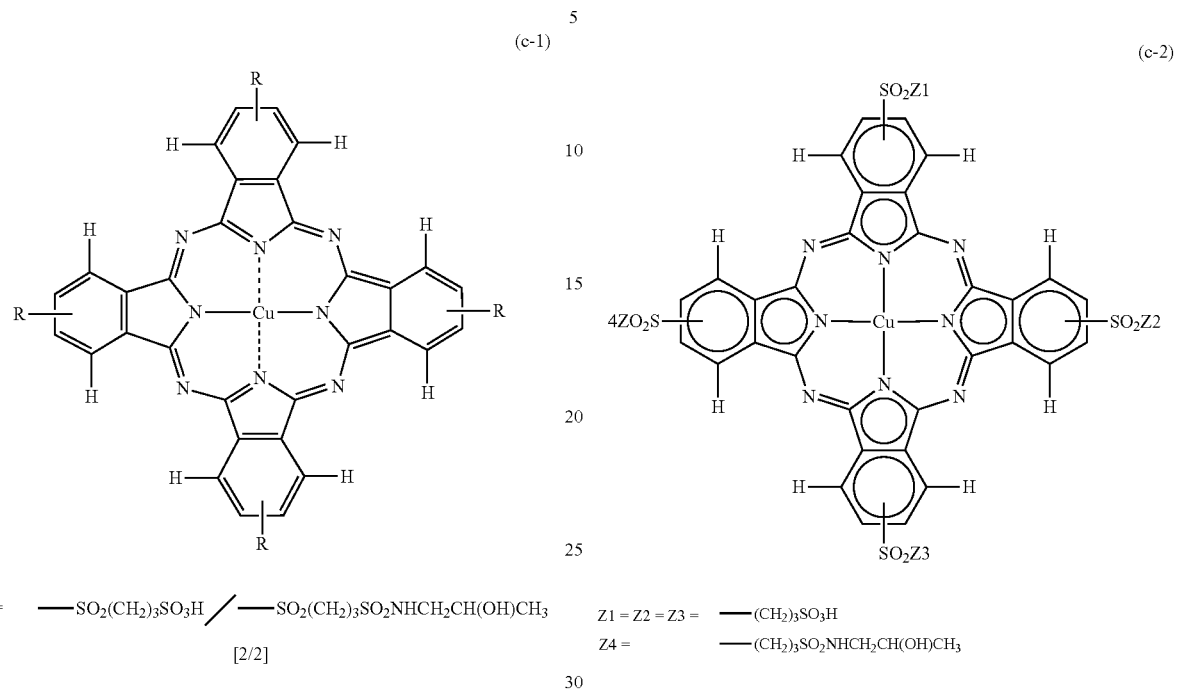

the compound represented by formula (c-2) below or a salt thereof, a compound represented by formula (c-3) below or a salt thereof,

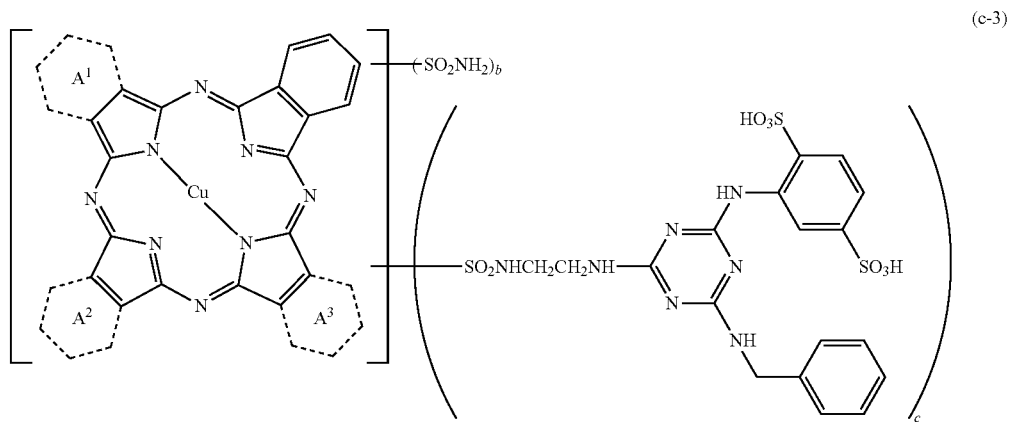

where 0≤b≤4, 0≤c≤4, and 1≤(b+c)≤4, where b+c represents an integer, and rings $A^1$, $A^2$, and $A^3$ are each selected from a benzene ring, a 2,3-pyridine ring, and a 3,2-pyridine ring, with at least one of rings $A^1$, $A^2$, and $A^3$ being a 2,3-pyridine ring or 3,2-pyridine ring, and rings $A^1$, $A^2$, and $A^3$ may be the same or different, the compound represented by formula (c-4) below or a salt thereof,

[Chem. 8]

(c-4)

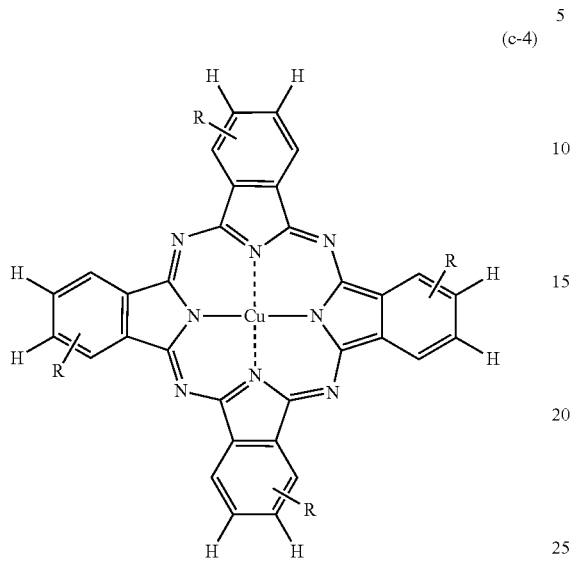

R = —SO₂(CH₂)₃SO₃H a compound represented by formula (c-5) below or a salt thereof,

[Chem. 9]

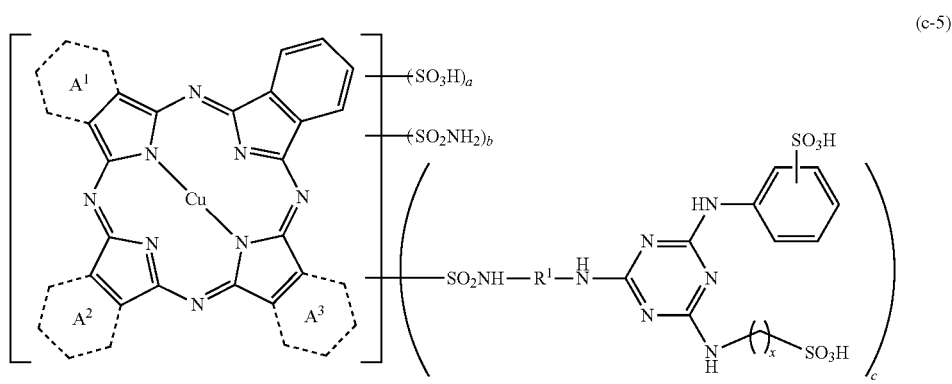

(c-5)

where rings $A^1$, $A^2$, and $A^3$ are each selected from a benzene ring, a 2,3-pyridine ring, and a 3,2-pyridine ring, with at least one of rings $A^1$, $A^2$, and $A^3$ being a 2,3-pyridine ring or 3,2-pyridine ring, and rings $A^1$, $A^2$, and $A^3$ may be the same or different, $1.0 \leq a \leq 3.0$, $0.2 \leq b \leq 1.8$, $0.8 \leq c \leq 1.6$, and $0 \leq a+b+c \leq 4$, $1 \geq x \geq 3$, where x is an integer, and $R^1$ is a C1 to C6 linear alkylene group, a compound represented by formula (c-6) below or a salt thereof,

[Chem. 10]

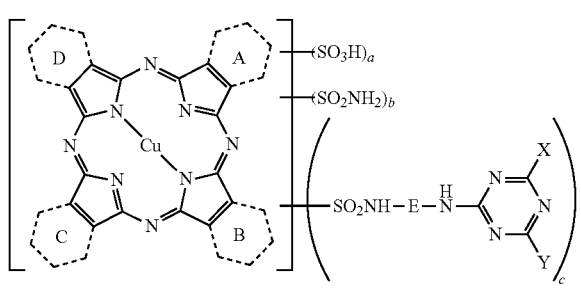

(c-6)

where rings A, B, C, and D are each independently an aromatic six-membered ring, with at least one of rings A, B, C, and D being a pyridine ring or pyrazine ring, E is an alkylene group, X is a sulfo-substituted anilino group, carboxy-substituted anilino group, or phosphono-substituted anilino group, and the substituted anilino group may further have one to four substituents selected from the group consisting of a sulfonic acid group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, a ureido group, an alkyl group, a nitro group, a cyano group, a halogen, an alkylsulfonyl group, and an alkylthio group, Y is a hydroxy group or amino group, and $0.0 \leq a \leq 2.0$, $0.0 \leq b \leq 3.0$, $0.1 \leq c \leq 3.0$, and $1.0 \leq a+b+c \leq 4.0$, a compound represented by formula (c-7) below or a salt thereof,

[Chem. 11]

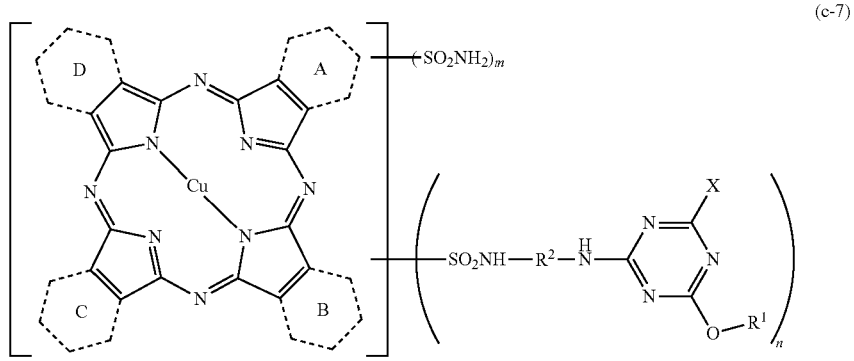

(c-7)

where rings A, B, C, and D each independently represent a benzene ring or nitrogen-containing heteroaromatic ring, with more than 0.0 and 3.0 or less of the four being a nitrogen-containing heteroaromatic ring or rings and the rest being a benzene ring or rings, $R^1$ represents an alkyl group, $R^2$ represents an alkylene group, and X represents an anilino group having one or more sulfonic acid groups, X may further have a substituent selected from the group consisting of a carboxy group, a phosphoric acid group, a hydroxy group, an alkoxy group, an alkylcarbonylamino group, a ureido group, a nitro group, and a halogen atom, and $0.0<m<3.9$, $0.1 \leq n<4.0$, and $1.0 \leq (m+n)<4.0$, a compound represented by formula (c-8) below or a salt thereof,

[Chem. 12]

(c-8)

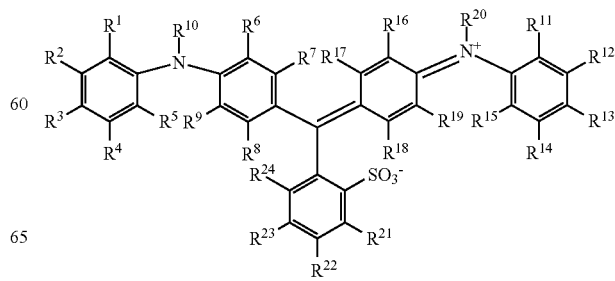

where $R^1$ to $R^{24}$ each independently represent a hydrogen atom, a halogen atom, an alkyl group, a cycloalkyl group, an alkenyl group, an alkynyl group, an aryl group, an aralkyl group, an acyl group, an acylamino group, a sulfonylamino group, an alkoxy group, an aryloxy group, a hydroxy group, an amino group, a nitro group, a cyano group, a sulfonic acid group, a carboxylic acid group, a sulfamoyl group, a carbamoyl group, an alkoxysulfonyl group, an alkoxycarbonyl group, an aryloxysulfonyl group, or an aryloxycarbonyl group and satisfy at least one of the following (X) and (Y): (X) at least one of $R^1$ to $R^{24}$ is a sulfonic acid group or carboxylic acid group; (Y) at least one of $R^6$, $R^7$, $R^8$, $R^9$, $R^{16}$, $R^{17}$, $R^{18}$, and $R^{19}$ is a halogen atom, acyl group, nitro group, or cyano group, a compound represented by formula (c-9) below or a salt thereof,

[Chem. 13]

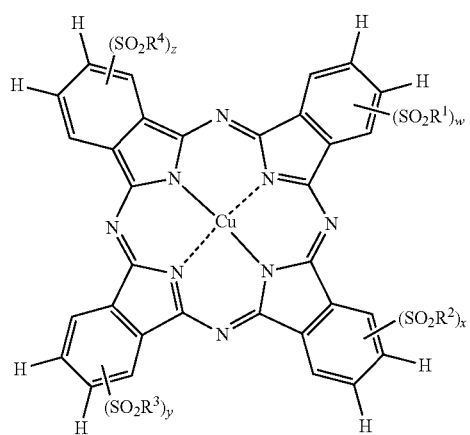

where $R^1$, $R^2$, $R^3$, and $R^4$ each independently represent an alkyl group, a cycloalkyl group, an alkenyl group, an aralkyl group, an aryl group, or a heterocyclic group, with at least one of $R^1$, $R^2$, $R^3$, and $R^4$ substituted with an ionic group, and w, x, y, and z each independently represent 1 or 2, and C.I. Direct Blue 199, and a magenta ink containing one or two or more selected from the compound represented by formula (m-1) below or a salt thereof,

[Chem. 14]

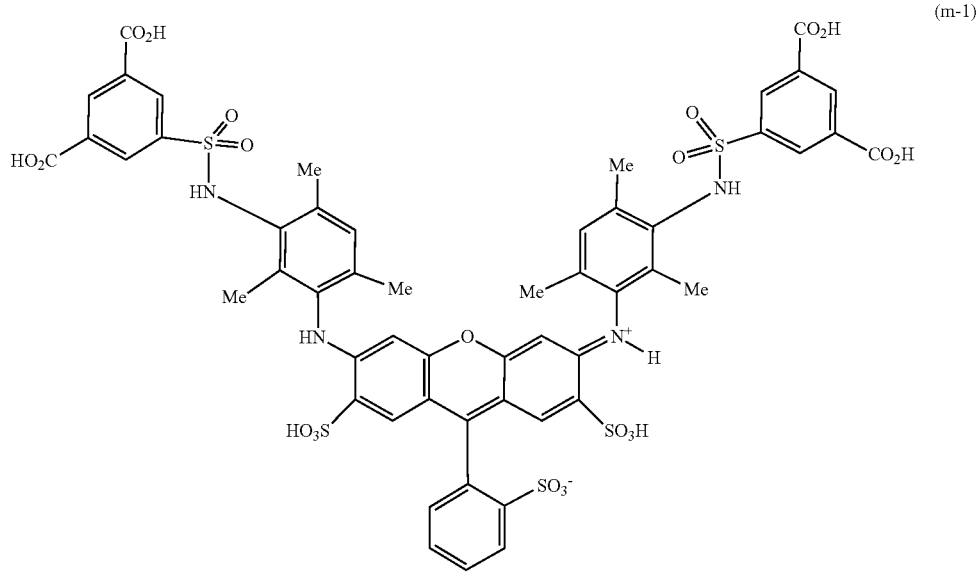

the compound represented by formula (m-2) below or a salt thereof,

[Chem. 15]

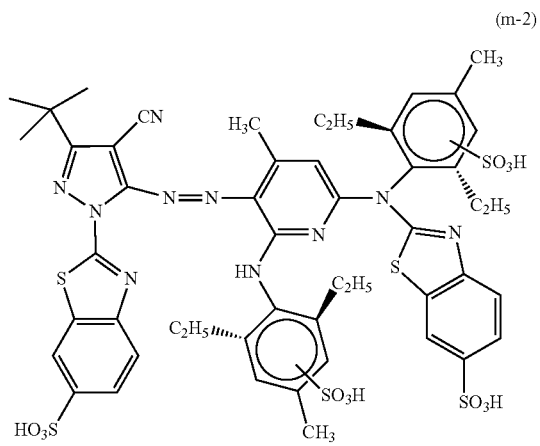

a compound represented by formula (m-3) below or a salt thereof,

[Chem. 16]

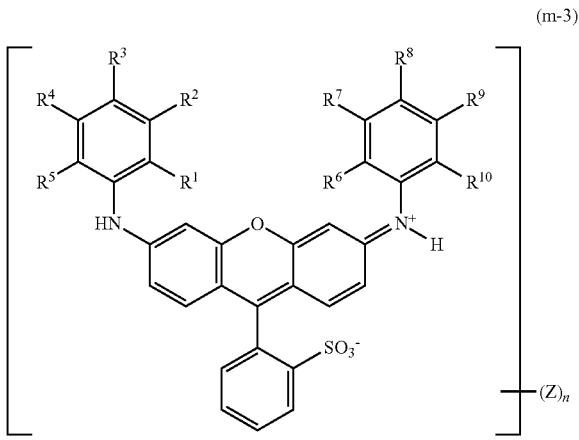

(m-3)

where $R^1$, $R^5$, $R^6$, and $R^{10}$ each independently represent an alkyl group, $R^3$ and $R^8$ each independently represent a hydrogen atom, an alkyl group, an alkoxy group, or an aryloxy group, and an alkyl group, an alkoxy group, and an aryloxy group may have at least one type of substituent selected from the group of types of substituents consisting of alkyl, aryl, arylalkyl, hydroxyl, carbamoyl, sulfamoyl, alkoxy, cyano, halogen, and ionic groups, $R^2$, $R^4$, $R^7$, and $R^9$ each independently represent a hydrogen atom or an acylamino group represented by formula (m-3') below, with at least one of $R^2$, $R^4$, $R^7$, and $R^9$ being an acylamino group represented by formula (m-3') below, Z represents a $SO_3H$ group, $SO_3M$ group, where M represents an ammonium ion or alkali metal ion, or sulfamoyl group, n represents an integer of 0 to 3 when at least one of $R^2$, $R^3$, $R^4$, $R^7$, $R^8$, and $R^9$ is substituted with an ionic group, and an integer of 1 to 3 when not, and Z, when present, is in place of at least one aromatic hydrogen atom,

[Chem. 17]

(m-3')

where $R^{11}$ represents an alkyl group, a cycloalkyl group, an aryl group, an arylalkyl group, an alkenyl group, or a heterocyclic group, and an alkyl group, a cycloalkyl group, an aryl group, an arylalkyl group, an alkenyl group, and a heterocyclic group may have at least one type of substituent selected from the group of types of substituents consisting of alkyl, aryl, arylalkyl, alkenyl, alkoxy, cyano, alkylamino, sulfoalkyl, carbamoyl, sulfamoyl, sulfonylamino, halogen, and ionic groups, and represents a site for binding with the aromatic ring or rings in formula (m-3), and C.I. Direct Red 227.

DESCRIPTION OF EXEMPLARY EMBODIMENTS

The following describes embodiments of the present disclosure. The following embodiments are descriptions of examples of the disclosure. The disclosure is never limited to these embodiments and includes variations implemented within the gist of the disclosure. Not all the configurations described below are essential for the disclosure.

1. Ink Set

An ink set according to this embodiment includes a pigment ink and a dye ink. There may be multiple pigment inks in the ink set, and there may be multiple dye inks in the ink set. The following describes examples of pigment inks that can be included in the ink set in the Pigment Inks section, a dye ink specific to the ink set according to this embodiment as a first dye ink, and other dye inks that may optionally be included in the ink set according to this embodiment besides the first dye ink as second dye inks.

The ink set according to this embodiment can therefore take a form that includes one or more pigment inks, which are discussed in the section "1.1. Pigment Inks," and a first dye ink, discussed in "1.2. First Dye Ink," or a form that includes one or more pigment inks, discussed in "1.1. Pigment Inks," a first dye ink, discussed in "1.2. First Dye Ink," and one or more second dye inks, discussed in "1.3. Second Dye Inks."

1.1. Pigment Inks

In the ink set according to this embodiment, a pigment ink or inks as described below are included. Any number of pigment inks can be included in the ink set. For example, the ink set may include a black pigment ink as its only pigment ink or may include more than one selected from cyan, magenta, yellow, black, and pigment inks in other colors. Whatever the number of pigment inks, a pigment ink contains at least a pigment.

1.1.1. Pigment

Pigments that can be used include inorganic pigments, including carbon black and titanium white, and organic pigments in different colors. In a pigment ink, the pigment may be what is called a self-dispersible pigment or may be dispersed with a dispersing resin.

Examples of inorganic pigments that can be used include carbon black (C.I. Pigment Black 7) pigments, such as furnace black, lamp black, acetylene black, and channel black, iron oxide, titanium oxide, zinc oxide, and silica.

Examples of carbon black pigments include Mitsubishi Chemical Corporation's No. 2300, 900, MCF88, No. 20B, No. 33, No. 40, No. 45, No. 52, MA7, MA8, MA100, and No. 2200B. Other examples include Degussa's Color Black FW1, FW2, FW2V, FW18, FW200, S150, S160, and S170, Printex 35, U, V, and 140U, and Special Black 6, 5, 4A, 4, and 250, Columbian Carbon's Conductex SC and Raven 1255, 5750, 5250, 5000, 3500, 1255, and 700, and Cabot's REGAL 400R, 330R, and 660R, MOGUL L, MONARCH 700, 800, 880, 900, 1000, 1100, 1300, and 1400, and ELFTEX 12. Self-dispersible pigments, such as Orient's BONJET BLACK CW-2, may also be used.

Examples of organic pigments include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Specific examples of organic pigments that can be used in a pigment ink include the following.

For cyan pigments, examples include C.I. Pigment Blue pigments, such as C.I. Pigment Blue 1, 2, 3, 15:3, 15:4, 15:34, 16, 22, and 60; and C.I. Vat Blue pigments, such as C.I. Vat Blue 4 and 60. An example of a preferred cyan pigment is one or a mixture of two or more selected from the group consisting of C.I. Pigment Blue 15:3, 15:4, and 60.

For magenta pigments, examples include C.I. Pigment Red 5, 7, 12, 48 (Ca), 48 (Mn), 57 (Ca), 57:1, 112, 122, 123, 168, 184, and 202 and C.I. Pigment Violet 19. An example of a preferred magenta pigment is one or a mixture of two or more selected from the group consisting of C.I. Pigment Red 122, 202, and 209 and C.I. Pigment Violet 19.

For yellow pigments, examples include C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, and 185. An example of a preferred yellow pigment is one or a mixture of two or more selected from the group consisting of C.I. Pigment Yellow 74, 109, 110, 128, and 138.

An orange pigment can be, for example, C.I. Pigment Orange 36 or 43 or a mixture of them. A pigment in a green ink can be, for example, C.I. Pigment Green 7 or 36 or a mixture of them.

These pigments listed by way of example are examples of preferred pigments and do not limit any aspect of the present disclosure. One of these pigments or a mixture of two or more may be used. These pigments, moreover, may be used in combination with dye(s).

The pigment may be used dispersed with a dispersant selected from, for example, water-soluble resins, water-dispersible resins, and surfactants. Alternatively, the surface of the pigment may be oxidized or sulfonated, for example with ozone, hypochlorous acid, or fuming sulfuric acid, to make the pigment self-dispersible before use.

The pigment content can be adjusted to be appropriate for the intended purpose of use. Preferably, the pigment content is 0.10% by mass or more and 20.0% by mass or less, more preferably 0.20% by mass or more and 15.0% by mass or less, even more preferably 1.0% by mass or more and 10.0% by mass or less, in particular 2.0% by mass or more and 6.0% by mass or less.

The volume-average diameter of the pigment particles is preferably 10.0 nm or more and 200.0 nm or less, more preferably 30.0 nm or more and 200.0 nm or less, even more preferably 50.0 nm or more and 150.0 nm or less, in particular 70.0 nm or more and 120.0 nm or less.

When a pigment in a pigment ink is dispersed with a dispersing resin, the ratio between the pigment and the dispersing resin is preferably from 10:1 to 1:10, more preferably from 4:1 to 1:3. The dispersed pigment has a maximum particle diameter of less than 500 nm and a volume-average particle diameter of 300 nm or less as measured by dynamic light scattering. More preferably, the volume-average particle diameter is 200 nm or less.

A pigment ink may contain a dye unless it inhibits the dispersion of the pigment. Examples of dyes that can be used in a pigment ink include water-soluble dyes, such as acidic dyes, direct dyes, reactive dyes, and basic dyes, and water-dispersible dyes, such as disperse dyes, solvent dyes, and sublimation dyes.

1.1.2. Extra Ingredients

A pigment ink according to this embodiment may contain a surfactant, an organic solvent, a resin, water, and other ingredients.

(1) Surfactant

A pigment ink may contain a surfactant. The surfactant reduces the surface tension of the pigment ink, thereby improving the wettability of the ink on a recording medium or substrate. Among surfactants, acetylene glycol surfactants, silicone surfactants, and fluorosurfactants are particularly preferred for use.

An acetylene glycol surfactant can be of any kind, but examples include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names; Air Products and Chemicals), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all are trade names; Nissin Chemical Industry), and ACETYLENOL E00, E00P, E40, and E100 (all are trade names; Kawaken Fine Chemicals).

A silicone surfactant can be of any kind, but an example of a preferred one is a polysiloxane compound. The polysiloxane compound can be of any kind, but an example is a polyether-modified organosiloxane. Examples of commercially available polyether-modified organosiloxanes include BYK-306, BYK-307, BYK-333, BYK-341, BYK-345, BYK-346, and BYK-348 (trade names; BYK Japan) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names; Shin-Etsu Chemical).

A fluorosurfactant is preferably a fluorine-modified polymer. Specific examples include BYK-3440 (BYK Japan), SURFLON S-241, S-242, and S-243 (trade names; AGC Seimi Chemical), and FTERGENT 215M (NEOS).

A pigment ink may contain multiple surfactants. When a pigment ink contains surfactant(s), the surfactant content is preferably 0.1% by mass or more and 2.0% by mass or less, more preferably 0.2% by mass or more and 1.5% by mass or less, even more preferably 0.3% by mass or more and 1.0% by mass or less of the total mass.

(2) Organic Solvent

A pigment ink may contain an organic solvent. Although a pigment ink may be organic solvent-free, the use of an organic solvent makes is easier to achieve quick drying combined with ejection stability. Water-soluble organic solvents are preferred.

A function of the organic solvent is to improve the wettability of the pigment ink on a recording medium and to enhance the water retention of the pigment ink. Examples of organic solvents include esters, alkylene glycol ethers, cyclic esters, nitrogen-containing solvents, and polyhydric alcohols. Examples of nitrogen-containing solvents include cyclic amides and acyclic amides. Examples of acyclic amides include alkoxyalkylamides.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

An alkylene glycol ether can be any monoether or diether of an alkylene glycol, preferably an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds resulting from the substitution of hydrogen(s) of the methylene group next to the carbonyl group of these lactones with a C1 to C4 alkyl group.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These are preferred because they help resin particles, described below, form a coating. 2-Pyrrolidone is particularly preferred.

It is also preferred to use an alkoxyalkylamide, a type of acyclic amide. An alkoxyalkylamide is a compound represented by general formula (1) below.

$$R^1-O-CH_2CH_2-(C=O)-NR^2R^3 \quad (1)$$

In formula (1) above, $R^1$ denotes a C1 to C4 alkyl group, and $R^2$ and $R^3$ each independently denote a methyl or ethyl group. The "C1 to C4 alkyl group" can be a linear or branched alkyl gruop. To name a few, it can be a methyl, ethyl, n-propyl, isopropyl, n-butyl, sec-butyl, isobutyl, or tert-butyl group. One of those compounds represented by formula (1) above may be used alone, or two or more may be used as a mixture.

Examples of polyhydric alcohols includes 1,2-alkanediols (e.g., alkanediols such as ethylene glycol, propylene glycol (aka: propane-1,2-diol), triethylene glycol, 1,2-butanediol, 1,2-pentanediol, 1,2-hexanediol, 1,2-heptanediol, and 1,2-octanediol) and polyhydric alcohols other than 1,2-alkanediols (polyols) (e.g., diethylene glycol, dipropylene glycol, 1,3-propanediol, 1,3-butanediol (aka: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerol).

A pigment ink may contain one of these organic solvents listed by way of example alone or may contain two or more in combination. When a pigment ink is made with organic solvent(s), the total percentage of organic solvents to the pigment ink as a whole is 3.0% by mass or more and 30.0% by mass or less, preferably 5.0% by mass or more and 25.0% by mass or less, more preferably 10.0% by mass or more and 20.0% by mass or less.

(3) Resin

A pigment ink may contain a resin. The resin can be contained as an emulsion of resin particles. A possible function of the resin is to serve as a fixing resin, or to improve the adhesion and abrasion resistance of the components of the pigment ink attached to a recording medium. Such resin particles can be, for example, particles of a urethane resin, acrylic resin, fluorene resin, polyolefin resin, rosin-modified resin, terpene resin, polyester resin, polyamide resin, epoxy resin, vinyl chloride resin, ethylene-vinyl acetate resin, vinyl acetate resin, butadiene resin, styrene resin, crosslinked acrylic resin, crosslinked styrene resin, benzoguanamine resin, phenolic resin, silicone resin, epoxy resin, paraffin resin, or fluoropolymer. These kinds of resin particles are usually handled in emulsion form but may alternatively be powder. One kind of resin particles or a combination of two or more kinds may be used.

Urethane resin is a generic term for resins that have the urethane linkage. A urethane resin may be, for example, a polyether urethane resin, which contains, besides the urethane linkage, the ether linkage in its backbone, a polyester urethane resin, which contains the ester linkage in its backbone, or a polycarbonate urethane resin, which contains the carbonate linkage in its backbone. Commercially available urethane resins may be used. For example, the urethane resin may be selected from commercially available urethane resins including SUPERFLEX 210, 460, 460s, 840, and E-4000 (trade names, DKS Co., Ltd.), RESAMINE D-1060, D-2020, D-4080, D-4200, D-6300, and D-6455 (trade names, Dainichiseika Color & Chemicals Mfg. Co., Ltd.), Takelac WS-6020, WS-6021, and W-512-A-6 (trade names, Mitsui Chemicals Polyurethanes, Inc.), Sancure 2710 (trade name, LUBRIZOL), and PERMARIN UA-150 (trade name, Sanyo Chemical Industries).

Acrylic resin is a generic term for polymers obtained by polymerizing at least an acrylic monomer, such as (meth) acrylic acid or a (meth)acrylate, as a component. Examples include resins obtained from an acrylic monomer and copolymers of an acrylic monomer and a different monomer. Examples include acryl-vinyl resins, which are copolymers of an acrylic monomer and a vinyl monomer. Copolymers with styrene or a similar vinyl monomer are another class of examples. The acrylic monomer can alternatively be, for example, acrylamide or acrylonitrile.

Commercially available resin emulsions made from acrylic resins may also be used, for example a resin emulsion selected from FK-854 (trade name, Chuo Rika Kogyo), Mowinyl 952B and 718A (trade names, the Nippon Synthetic Chemical Industry), Nipol LX852 and LX874 (trade names, Zeon), POLYSOL AT860 (Showa Denko K.K.), and VONCOAT AN-1190S, YG-651, AC-501, AN-1170, and 4001 (trade names, DIC, acrylic resin emulsions).

As mentioned above, an acrylic resin herein may be a styrene-acrylic resin. The expression (meth)acrylic herein refers to at least one of acrylic and methacrylic.

A styrene-acrylic resin is a copolymer of a styrene monomer and an acrylic monomer. Examples include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. Commercially available styrene-acrylic resins may be used, for example a styrene-acrylic resin selected from Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, BASF) and Mowinyl 966A and 975N (trade names, the Nippon Synthetic Chemical Industry).

A vinyl chloride resin can be a vinyl chloride-vinyl acetate copolymer.

A polyolefin resin is a resin that has an olefin, such as ethylene, propylene, or butylene, as its structural backbone and can be a suitable one selected from known polyolefin resins. Commercially available olefin resins may be used, for example an olefin resin selected from ARROWBASE CB-1200 and CD-1200 (trade names, UNITIKA Ltd.).

The resin particles, moreover, may be supplied in emulsion form. Examples of a commercially available collection of such resin emulsions include MICROGEL E-1002 and E-5002 (trade names of Nippon Paint products, styrene-acrylic resin emulsions), VONCOAT AN-1190S, YG-651, AC-501, AN-1170, 4001, and 5454 (trade names of DIC products, styrene-acrylic resin emulsions), POLYSOL AM-710, AM-920, AM-2300, AP-4735, AT-860, and PSASE-4210E (acrylic resin emulsions), POLYSOL AP-7020 (styrene-acrylic resin emulsion), POLYSOL SH-502 (vinyl acetate resin emulsion), POLYSOL AD-13, AD-2, AD-10, AD-96, AD-17, and AD-70 (ethylene-vinyl acetate resin emulsions), POLYSOL PSASE-6010 (ethylene-vinyl acetate resin emulsion) (trade names of Showa Denko products), POLYSOL SAE1014 (trade name, a styrene-acrylic resin emulsion, Zeon), SAIVINOL SK-200 (trade name, an acrylic resin emulsion, Saiden Chemical Industry), AE-120A (trade name of a JSR product, an acrylic resin emulsion), AE373D (trade name of an Emulsion Technology product, a carboxy-modified styrene-acrylic resin emulsion), SEIKADYNE 1900W (trade name of a Dainichiseika Color & Chemicals Mfg. product, an ethylene-vinyl acetate resin emulsion), VINYBLAN 2682 (acrylic resin emulsion), VINYBLAN 2886 (vinyl acetate-acrylic resin emulsion), VINYBLAN 5202 (acetic acid-acrylic resin emulsion) (trade names of Nissin Chemical Industry products), VINYBLAN 700 and 2586 (Nissin Chemical Industry), elitel KA-5071S, KT-8803, KT-9204, KT-8701, KT-8904, and KT-0507 (trade names of Unitika products, polyester resin emulsions), Hytec SN-2002 (trade name of a Toho Chemical product, a polyester resin emulsion), Takelac W-6020, W-635, W-6061, W-605, W-635, and W-6021 (trade names of Mitsui Chemicals Polyurethanes products, urethane resin emulsions), SUPERFLEX 870, 800, 150, 420, 460, 470, 610, 620, and 700 (trade names of DKS products, urethane resin emulsions), PERMARIN UA-150 (Sanyo Chemical Industries, Ltd., a urethane resin emulsion), Sancure 2710 (Lubrizol Japan, a urethane resin emulsion), NeoRez R-9660, R-9637, and R-940 (Kusumoto Chemicals Ltd., urethane resin emulsions), ADEKA BONTIGHTER HUX-380 and 290K (ADEKA Corporation, urethane resin emulsions), Mowinyl 966A and Mowinyl 7320 (the Nippon Synthetic Chemical Industry Co., Ltd.), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (BASF), NK Binder R-5HN (Shin-Nakamura Chemical Co., Ltd.), HYDRAN WLS-210 (non-crosslinked polyurethane, DIC Corporation), and Joncryl 7610 (BASF), and the resin emulsion may be selected from these commercially available ones.

When resin particles are contained, as a resin, in a pigment ink, their percentage is 0.1% by mass or more and 10.0% by mass or less, preferably 1.0% by mass or more and 5.0% by mass or less, more preferably 1.0% by mass or more and 3.0% by mass or less of the total mass of the ink on a solids basis.

(4) Water

A pigment ink may contain water. Water-based pigment inks are preferred. A water-based composition contains water as a major solvent component. The water may be contained as the primary solvent component and is a component that evaporates away upon drying. Preferably, the water is of a type from which ionic impurities have been removed to the lowest possible levels, such as ion exchange water, ultrafiltered water, reverse osmosis water, distilled water, or any other type of purified water or ultrapure water. The use of sterilized water, for example sterilized by ultraviolet irradiation or adding hydrogen peroxide, is preferred because it helps control fungal and bacterial development when the pigment ink is stored long. The water content is preferably 75.0% by mass or more, more preferably 80.0% by mass or more and 98% by mass or less, even more preferably 85.0% by mass or more and 95.0% by mass or less of the total mass of the pigment ink.

(5) Others

A pigment ink may contain extra ingredients, such as a pigment dispersant, a pH-adjusting agent, an antimold/preservative, a chelating agent, an antirust, a fungicide, an antioxidant, an antireductant, and a drying agent.

A pigment dispersant can be any known resin that can be used in ink jet inks. Preferably, the pigment dispersant has at least an anionic group in its hydrophilic group. The hydrophilic group can be, for example, one formed by a hydrophilic monomer, such as (meth)acrylic acid or its salt. The hydrophobic group can be, for example, a functional group formed by a hydrophobic monomer, such as a monomer having an aromatic ring, e.g., styrene or its derivative or benzyl (meth)acrylate, or a monomer having an aliphatic group, e.g., a (meth)acrylate.

For pH-adjusting agents, examples include ureas, amines, morpholines, piperazines, and aminoalcohols, for example a combination of secondary or more aminoalcohols. Examples of ureas include urea, ethylene urea, tetramethylurea, thiourea, 1,3-dimethyl-2-imidazolidinone and similar compounds and betaines (e.g., trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, and acetylcarnitine). Examples of amines include diethanolamine and triisopropanolamines. The use of a pH-adjusting agent helps, for example, adjust the detergency of the pigment ink by helping reduce or enhance the dissolution of impurities from elements forming the channel through which the ink flows.

For antimolds/preservatives, examples include PROXEL CRL, PROXEL BDN, PROXEL GXL, PROXEL XL-2, PROXEL IB, and PROXEL TN. The use of an antimold/ preservative ensures better storage properties of the pigment ink by helping control fungal and bacterial growth.

For chelating agents, examples include ethylenediaminetetraacetic acid (EDTA) and the nitrilotriacetate, hexametaphosphate, pyrophosphate, or metaphosphate of ethylenediamine.

1.2. First Dye Ink

In the ink set according to this embodiment, a first dye ink is included. Any number of dye inks may be included in the ink set, but the ink set includes a first dye ink as described below. The first dye ink is included in the ink set as, for example, a yellow dye ink. A form of the ink set according to this embodiment may include multiple dye inks, and the dye ink(s) other than the first dye ink included in such a form of the ink set is described later in the section of "1.3. Second Dye Inks."

The first dye ink contains the compound represented by formula (y-1) or its salt.

[Chem. 18]

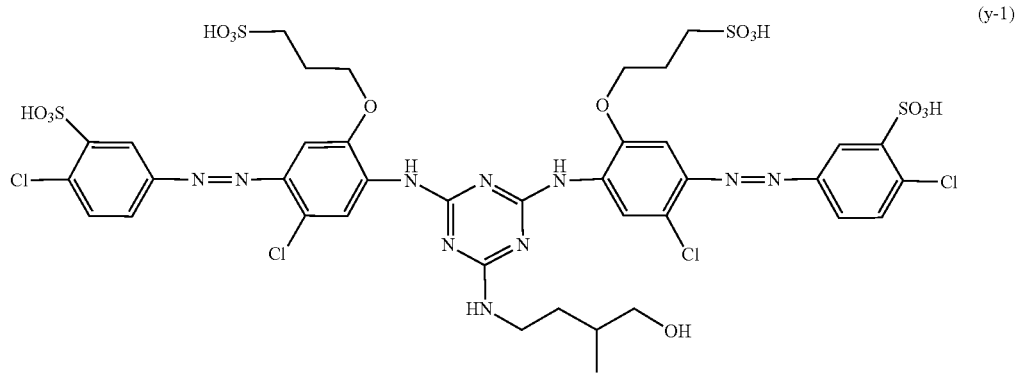

(y-1)

In formula (y-1), the compound has four sulfonic acid groups that may each independently be in the sulfonate form. Examples of counterions in a salt of the compound represented by formula (y-1) include the hydrogen ion (proton), lithium, sodium, potassium, and ammonium, and the salt may have counterions of the same species or different counterions at its four sulfonic acid groups. The compound represented by formula (y-1) or its salt is a yellow or yellowish dye. "The compound represented by formula (y-1) or its salt" may hereinafter be referred to simply as "a (y-1) dye."

After studying a wide variety of yellow and yellowish dye inks, the inventors found that inks made with a (y-1) dye, when mixed with a pigment ink, are unlikely to affect the dispersion of the pigment(s) in the pigment ink compared with dye inks made with other yellow or yellowish dyes. The underlying mechanism remains to be clearly understood, but the inventors presume that the effect owes to the nature of the 3-methyl-4-hydroxy-amino group bound to the triazine ring in the (y-1) dye.

By virtue of the presence of the first dye ink in the ink set according to this embodiment, good dispersion in the pigment ink(s) in the ink set is maintained even in the event the first dye ink touches the pigment ink(s). This trend becomes more significant when the pigment ink(s) is black ink(s). This is because the dispersion of a pigment deteriorates more seriously when a black pigment ink touches a known yellow or yellowish ink than when a pigment ink in any other color touches a known yellow or yellowish ink, and because the dispersion of a pigment deteriorates more seriously when a black pigment ink touches a known yellow or yellowish ink than when it touches a known dye ink in any other color. In the ink set according to this embodiment, in which a (y-1) dye is used in a yellow or yellowish ink, therefore, dispersion in the pigment ink(s) in the set is kept sufficiently good.

1.2.1. Other Dyes

Besides the (y-1) dye, the first dye ink may further contain the compound represented by formula (y-2) below or its salt.

[Chem. 19]

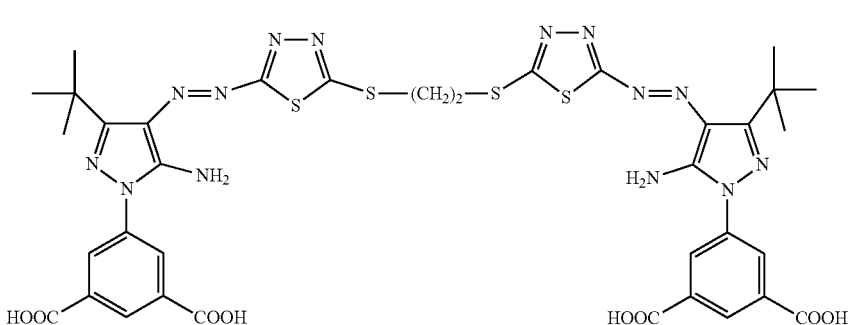

(y-2)

In formula (y-2), the compound has four carboxy groups that may each independently be in the carboxylate form. Examples of counterions in a salt of the compound represented by formula (y-2) include the hydrogen ion (proton), lithium, sodium, potassium, and ammonium, and the salt may have counterions of the same species or different counterions at its four carboxy groups. The compound represented by formula (y-2) or its salt is a yellow or yellowish dye. "The compound represented by formula (y-2) or its salt" may hereinafter be referred to simply as "a (y-2) dye."

Besides the (y-1) dye, the first dye ink may further contain the compound represented by formula (y-3) or its salt.

[Chem. 20]

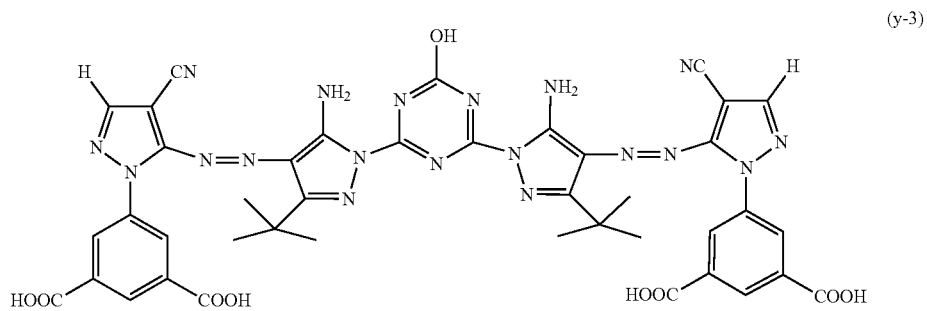

(y-3)

In formula (y-3), the compound has four carboxy groups that may each independently be in the carboxylate form. Examples of counterions in a salt of the compound represented by formula (y-3) include the hydrogen ion (proton), lithium, sodium, potassium, and ammonium, and the salt may have counterions of the same species or different counterions at its four carboxy groups. The compound represented by formula (y-3) or its salt is a yellow or yellowish dye. "The compound represented by formula (y-3) or its salt" may hereinafter be referred to simply as "a (y-3) dye."

Besides the (y-1) dye, the first dye ink may further contain the compound represented by formula (y-4) below or its salt.

[Chem. 21]

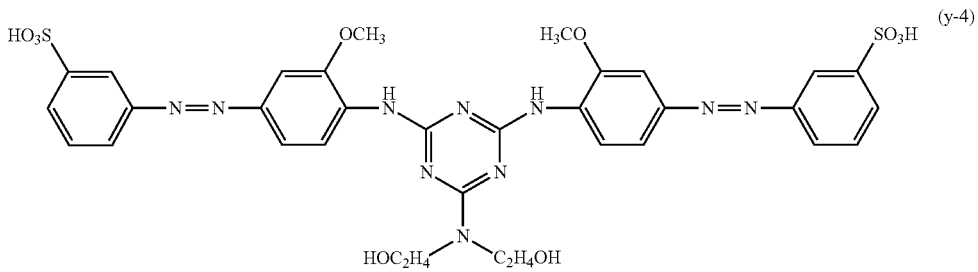

(y-4)

In formula (y-4), the compound has two sulfonic acid groups that may each independently be in the sulfonate form. Examples of counterions in a salt of the compound represented by formula (y-4) include the hydrogen ion (proton), lithium, sodium, potassium, and ammonium, and the salt may have counterions of the same species or different counterions at its two sulfonic acid groups. The compound represented by formula (y-4) or its salt is a yellow or yellowish dye. "The compound represented by formula (y-4) or its salt" may hereinafter be referred to simply as "a (y-4) dye."

The first dye ink, moreover, may further contain C.I. Direct Yellow 86 besides the (y-1) dye. The first dye ink may further contain C.I. Direct Yellow 132 besides the (y-1) dye.

C.I. Direct Yellow 86 and C.I. Direct Yellow 132 are both yellow or yellowish dyes, and dyes of these classes that are commercially available as reagents or products can be used.

The first dye ink may contain one or two or more dyes selected from the (y-2) dyes, the (y-3) dyes, the (y-4) dyes, C.I. Direct Yellow 86, and C.I. Direct Yellow 132. When it does, however, it is preferred that the (y-1) dye content of the first dye ink be 60.0% by mass or more and 99.0% by mass or less, more preferably 60.0% by mass or more and 90.0% by mass or less, even more preferably 70.0% by mass or more and 90.0% by mass or less, in particular 80.0% by mass or more and 90.0% by mass or less of the total mass of dyes in the first dye ink.

The (y-1) dyes exhibit a yellow or yellowish color but are faintly tinged red. The (y-2) dyes, the (y-3) dyes, the (y-4) dyes, C.I. Direct Yellow 86, and C.I. Direct Yellow 132 are yellow or yellowish and faintly tinged green. The use of any of these dyes in the first dye ink can therefore help further extend the gamut of the ink set.

As for the preference for the (y-1) dye content of the first dye ink in that case, 60.0% by mass or more and 99.0% by mass or less, it is because the use of the (y-1) dye in such a percentage helps extend the gamut, as well as ensuring that the first dye ink rarely causes the aggregation of the components of any pigment ink it touches.

The first dye ink may contain other yellow or yellowish dyes, but they would probably have little effect in extending the gamut when compared with the (y-2) dyes, the (y-3) dyes, the (y-4) dyes, C.I. Direct Yellow 86, and C.I. Direct Yellow 132. However, even when any such yellow or yellowish dye is contained in the first dye ink, it remains preferred to ensure that the (y-1) dye content of the first dye ink is 60.0% by mass or more and 99.0% by mass or less of the total mass of dyes in the first dye ink.

1.2.2. Extra Ingredients

The first dye ink may contain a surfactant, an organic solvent, water, and other ingredients. These surfactant, organic solvent, water, and other ingredients are as described in the above section of "1.1. Pigment Inks" and are not discussed again. Read the words like "a pigment ink" as "the first dye ink" in that section. It should be noted that the first dye ink, unlike pigment inks, does not contain a pigment. The first dye ink may therefore be free of resins for fixing a pigment and of pigment dispersants for dispersing a pigment unless necessary.

Because of its structure, the (y-1) dye in the first dye ink should be highly hydrophobic compared with other yellow or yellowish dyes. It is therefore preferred that 5.0% by mass or more organic solvent having an sp of 12.5 or less be present in the first dye ink. This increases the solubility of the (y-1) dye, thereby helping prevent the nozzle clogging defect that occurs when the dye separates out in a head after the first dye ink is left unused long. The sp of such an organic solvent is more preferably 11.0 or less, even more preferably 10.5 or less. The percentage of such an organic solvent is more preferably 7.0% by mass or more, even more preferably 10.0% by mass or more.

The "sp" of an organic solvent is a value called Solubility Parameter. An sp represents a value calculated using the Hansen equation, which is given below. The Hansen solubility parameters are a three-dimensional representation of the solubility parameter introduced by Hildebrand using the three components of the dispersion term δd, polarity term δp, and hydrogen-bond term δh. The sps herein are expressed in the unit $[(cal/cm^3)^{1/2}]$ and are values calculated using the mathematical expression below.

$$sp\ [(cal/cm^3)^{1/2}] = (\delta d^2 + \delta p^2 + \delta h^2)^{1/2}$$

The dispersion (force) term δd, dipolar intermolecular force (polarity) term δp, and hydrogen-bond (force) term δh in this equation have been determined variously by Hansen and his followers and can be found on, for example, pages 698 to 711 in Section VII of the Polymer Handbook (fourth edition). Many solvents and resins have also been studied for the Hansen solubility parameters, and typical solubility parameters can be found in publications such as the Industrial Solvents Handbook (Wesley L. Archer) and "*SHIKIZAI* (the Journal of the Japan Society of Colour Material), 77 [4], 188-192 (2004)." These values can be used to determine the sp of organic solvents.

1.3. Second Dye Inks

In the ink set according to this embodiment, multiple dye inks may be included; a second dye ink may be included besides the first dye ink. Even the presence of multiple second dye inks in the ink set is allowed. Since the first dye ink is a yellow or yellowish ink as stated above, the second dye ink(s) is preferably dye ink(s) that is/are not yellow or yellowish. The following describes, as second dye inks, dye inks that are not yellow or yellowish.

A second dye ink may contain a dye that is not yellow or yellowish, a surfactant, an organic solvent, water, and other ingredients. The surfactant, organic solvent, water, and other ingredients are as described in the above section of "1.1. Pigment Inks" and are not discussed again. Read the words "pigment ink" as "second dye ink" in that section. It should be noted that second dye inks, unlike pigment inks, do not contain a pigment. A second dye ink may therefore be free of resins for fixing a pigment and of pigment dispersants for dispersing a pigment unless necessary.

Any number of second dye inks may be included in the ink set. Since the first dye ink is a yellow or yellowish ink, it is preferred that cyan and magenta inks, for example, be included as second dye inks in the ink set. As already mentioned, yellow or yellowish dye inks can be damaging to dispersion in pigment inks unless they contain a (y-1) dye as does the first dye ink.

The following describes a cyan ink and a magenta ink as second dye inks. Even for cyan and magenta inks, it remains preferred that the ink be unlikely to affect dispersion in the pigment ink(s); there are preferred dyes for each of them.

1.3.1. Cyan Ink

The cyan ink contains at least one cyan or substantially cyan dye.

Preferably, the cyan or substantially cyan dye is one or two or more selected from:

the compound represented by formula (c-1) below or its salt;

[Chem. 22]

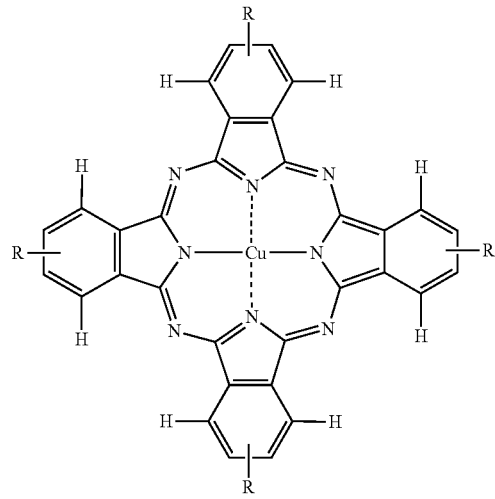

R = —SO$_2$(CH$_2$)$_3$SO$_3$H / —SO$_2$(CH$_2$)$_3$SO$_2$NHCH$_2$CH(OH)CH$_3$

[Chem. 23]

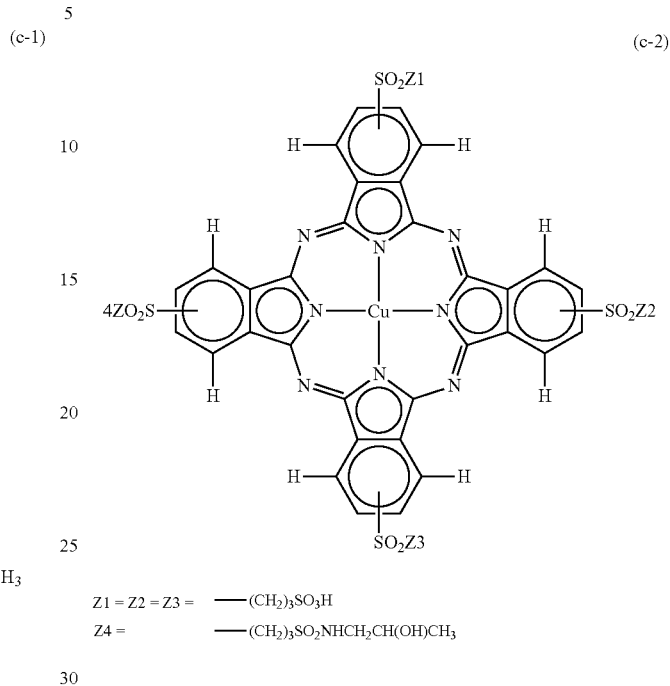

Z1 = Z2 = Z3 = —(CH$_2$)$_3$SO$_3$H
Z4 = —(CH$_2$)$_3$SO$_2$NHCH$_2$CH(OH)CH$_3$ the compound represented by formula (c-2) below or its salt;

a compound represented by formula (c-3) below or its salt

[Chem. 24]

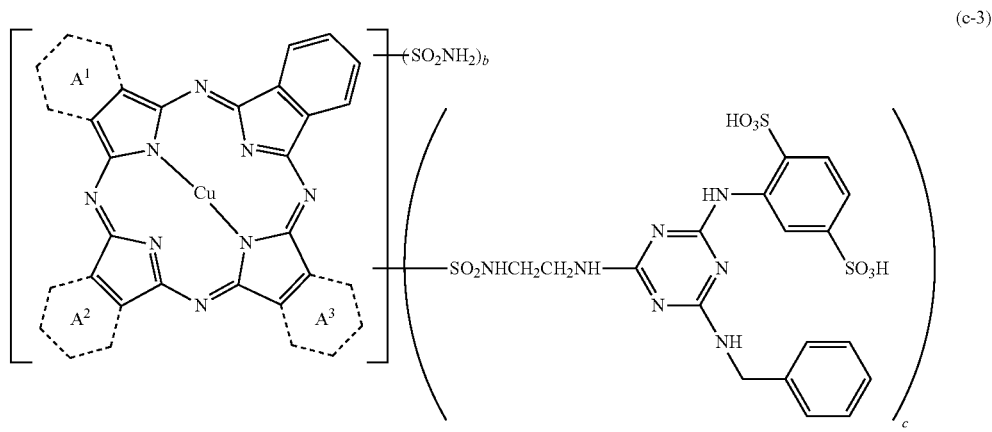

(In formula (c-3), 0≤b≤4, 0≤c≤4, and 1≤(b+c)≤4, where b+c represents an integer; and rings $A^1$, $A^2$, and $A^3$ are each selected from a benzene ring, a 2,3-pyridine ring, and a 3,2-pyridine ring, with at least one of rings $A^1$, $A^2$, and $A^3$ being a 2,3-pyridine ring or 3,2-pyridine ring, and rings $A^1$, $A^2$, and $A^3$ may be the same or different.);

the compound represented by formula (c-4) below or its salt;

[Chem. 25]

(c-4)

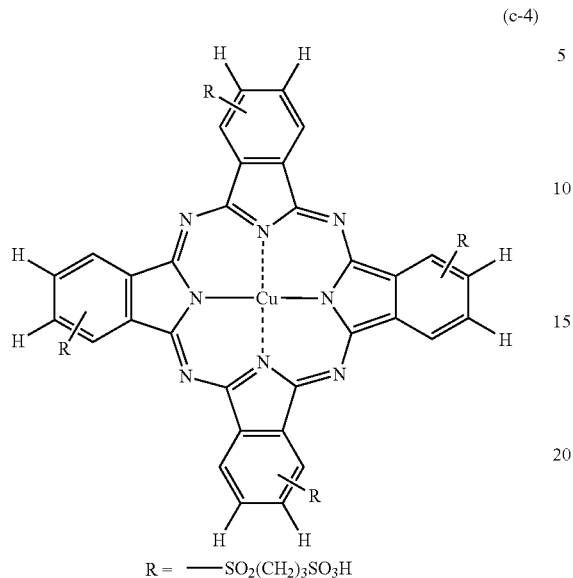

R = —SO$_2$(CH$_2$)$_3$SO$_3$H a compound represented by formula (c-5) below or its salt

[Chem. 26]

(c-5)

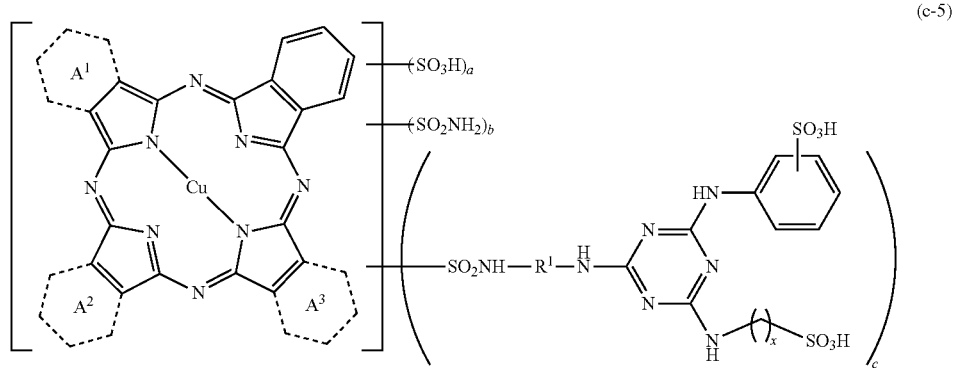

(In formula (c-5), rings A$^1$, A$^2$, and A$^3$ are each selected from a benzene ring, a 2,3-pyridine ring, and a 3,2-pyridine ring, with at least one of rings A$^1$, A$^2$, and A$^3$ being a 2,3-pyridine ring or 3,2-pyridine ring, and rings A$^1$, A$^2$, and A$^3$ may be the same or different; $1.0 \leq a \leq 3.0$, $0.2 \leq b \leq 1.8$, $0.8 \leq c \leq 1.6$, and $0 \leq a+b+c \leq 4$; $1 \geq x \leq 3$, where x is an integer; and R$^1$ is a C1 to C6 linear alkylene group.);

a compound represented by formula (c-6) below or its salt

[Chem. 27]

(c-6)

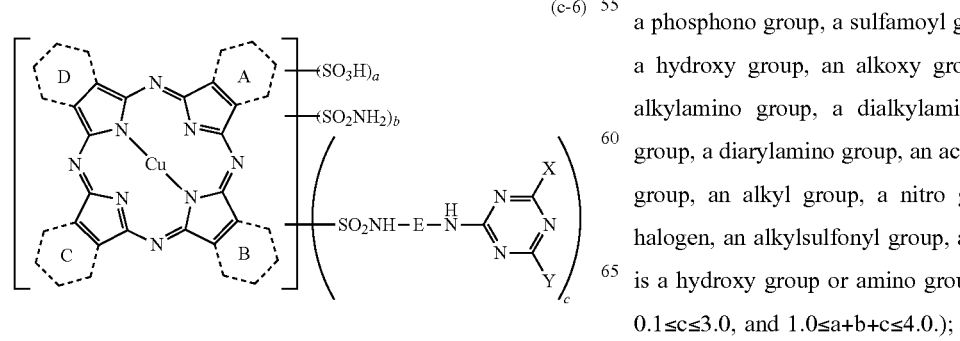

(In formula (c-6), rings A, B, C, and D are each independently an aromatic six-membered ring, with at least one of rings A, B, C, and D being a pyridine ring or pyrazine ring. E is an alkylene group. X is a sulfo-substituted anilino group, carboxy-substituted anilino group, or phosphono-substituted anilino group, and the substituted anilino group may further have one to four substituents selected from the group consisting of a sulfonic acid group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, a ureido group, an alkyl group, a nitro group, a cyano group, a halogen, an alkylsulfonyl group, and an alkylthio group. Y is a hydroxy group or amino group. $0.0 \leq a \leq 2.0$, $0.0 \leq b \leq 3.0$, $0.1 \leq c \leq 3.0$, and $1.0 \leq a+b+c \leq 4.0$.);

a compound represented by formula (c-7) below or its salt

[Chem. 28]

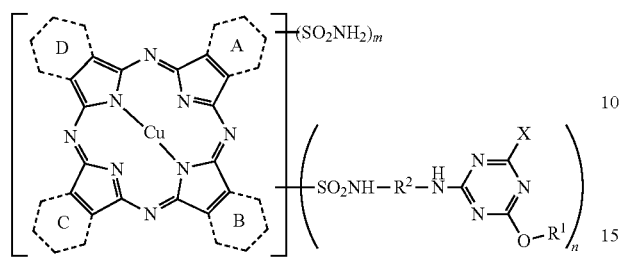
(c-7)

(In formula (c-7), rings A, B, C, and D each independently represent a benzene ring or nitrogen-containing heteroaromatic ring, with more than 0.0 and 3.0 or less of the four being a nitrogen-containing heteroaromatic ring or rings and the rest being a benzene ring or rings. $R^1$ represents an alkyl group, $R^2$ represents an alkylene group, and X represents an anilino group having one or more sulfonic acid groups. X may further have a substituent selected from the group consisting of a carboxy group, a phosphoric acid group, a hydroxy group, an alkoxy group, an alkylcarbonylamino group, a ureido group, a nitro group, and a halogen atom. $0.0<m<3.9$, $0.1≤n<4.0$, and $1.0≤(m+n)<4.0$.);

a compound represented by formula (c-8) below or its salt

[Chem. 29]

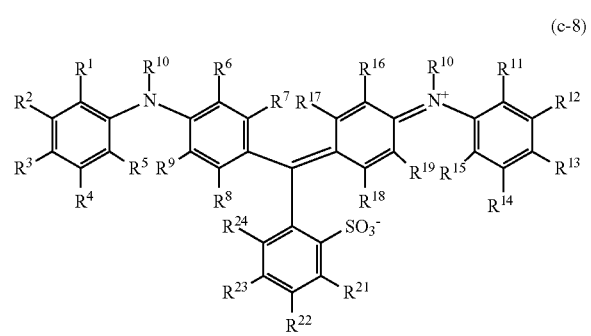
(c-8)

(In formula (c-8), $R^1$ to $R^{24}$ each independently represent a hydrogen atom, a halogen atom, an alkyl group, a cycloalkyl group, an alkenyl group, an alkynyl group, an aryl group, an aralkyl group, an acyl group, an acylamino group, a sulfonylamino group, an alkoxy group, an aryloxy group, a hydroxy group, an amino group, a nitro group, a cyano group, a sulfonic acid group, a carboxylic acid group, a sulfamoyl group, a carbamoyl group, an alkoxysulfonyl group, an alkoxycarbonyl group, an aryloxysulfonyl group, or an aryloxycarbonyl group and satisfy at least one of the following (X) and (Y). (X) At least one of $R^1$ to $R^{24}$ is a sulfonic acid group or carboxylic acid group. (Y) At least one of $R^6$, $R^7$, $R^8$, $R^9$, $R^{16}$, $R^{17}$, $R^{18}$, and $R^{19}$ is a halogen atom, acyl group, nitro group, or cyano group.);

a compound represented by formula (c-9) below or its salt

[Chem. 30]

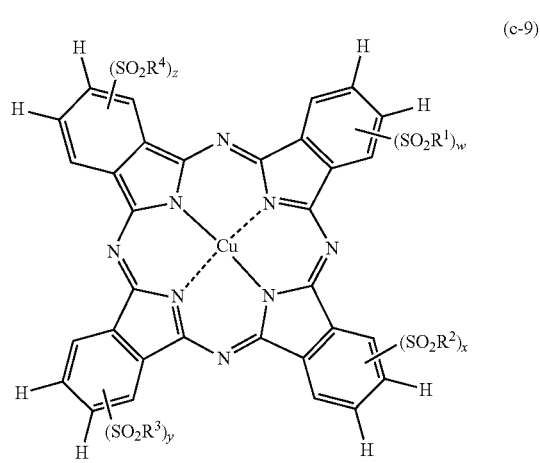
(c-9)

(In formula (c-9), $R^1$, $R^2$, $R^3$, and $R^4$ each independently represent an alkyl group, a cycloalkyl group, an alkenyl group, an aralkyl group, an aryl group, or a heterocyclic group, with at least one of $R^1$, $R^2$, $R^3$, and $R^4$ substituted with an ionic group. w, x, y, and z each independently represent 1 or 2.); and C.I. Direct Blue 199.

Examples of counterions in a salt of a/the compound represented by formula (c-A) (A is a number from 1 to 9) include the hydrogen ion (proton), lithium, sodium, potassium, and ammonium, and the salt may have counterions of the same species or different counterions at its relevant groups. A/The compound represented by formula (c-A) or its salt is a cyan or substantially cyan dye. "A/The compound represented by formula (c-A) or its salt" may hereinafter be referred to simply as "a (c-A) dye."

The cyan or substantially cyan dye may be, for example, C.I. Direct Blue 1, 2, 15, 71, 86, 87, 98, 165, and/or 202, but it is preferred to use any of the above-listed preferred dyes as primary dye(s).

1.3.2. Magenta Ink

The magenta ink contains at least one magenta or substantially magenta dye.

Preferably, the magenta or substantially magenta dye is one or two or more selected from:

the compound represented by formula (m-1) below or its salt;

[Chem. 31]

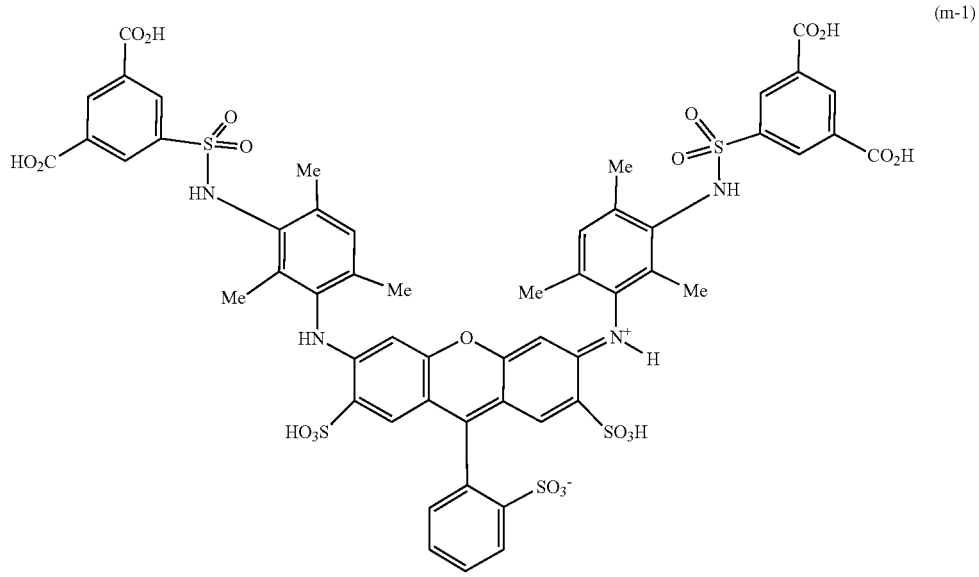

(m-1)

the compound represented by formula (m-2) below or its salt;

[Chem. 32]

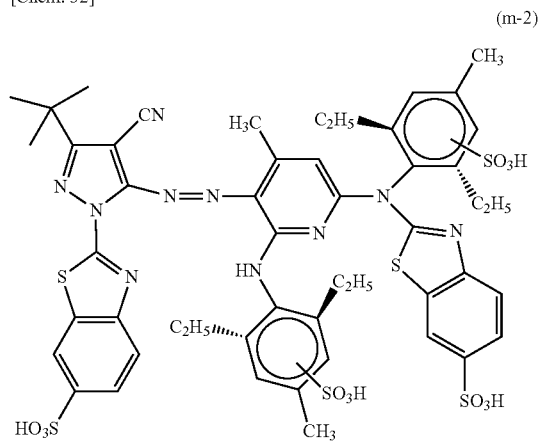

(m-2)

a compound represented by formula (m-3) below or its salt

[Chem. 33]

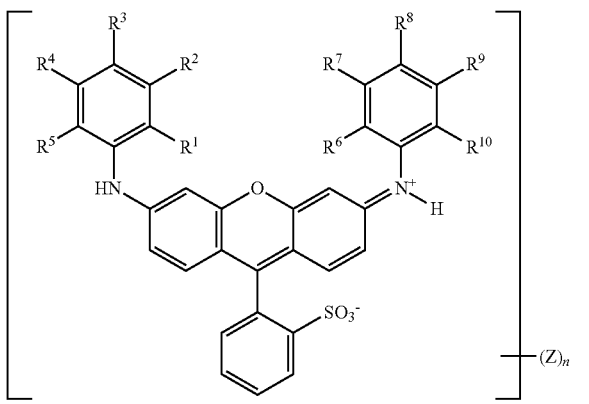

(m-3)

(In formula (m-3), $R^1$, $R^5$, $R^6$, and $R^{10}$ each independently represent an alkyl group. $R^3$ and $R^8$ each independently represent a hydrogen atom, an alkyl group, an alkoxy group, or an aryloxy group, and an alkyl group, an alkoxy group, and an aryloxy group may have at least one type of substituent selected from the group of types of substituents consisting of alkyl, aryl, arylalkyl, hydroxyl, carbamoyl, sulfamoyl, alkoxy, cyano, halogen, and ionic groups. $R^2$, $R^4$, $R^7$, and $R^9$ each independently represent a hydrogen atom or an acylamino group represented by formula (m-3') below, with at least one of $R^2$, $R^4$, $R^7$, and $R^9$ being an acylamino group represented by formula (m-3') below. Z represents a $SO_3H$ group, $SO_3M$ group (where M represents an ammonium ion or alkali metal ion), or sulfamoyl group. n represents an integer of 0 to 3 when at least one of $R^2$, $R^3$, $R^4$, $R^7$, $R^8$, and $R^9$ is substituted with an ionic group, and an integer of 1 to 3 when not, and Z, when present, is in place of at least one aromatic hydrogen atom.)

[Chem. 34]

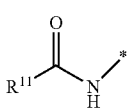

(m-3')

(In formula (m-3'), $R^{11}$ represents an alkyl group, a cycloalkyl group, an aryl group, an arylalkyl group, an alkenyl group, or a heterocyclic group, and an alkyl group, a cycloalkyl group, an aryl group, an arylalkyl group, an alkenyl group, and a heterocyclic group may have at least one type of substituent selected from the group of types of substituents consisting of alkyl, aryl, arylalkyl, alkenyl, alkoxy, cyano, alkylamino, sulfoalkyl, carbamoyl, sulfamoyl, sulfonylamino, halogen, and ionic groups. * represents a site for binding with the aromatic ring(s) in formula (m-3)); and C.I. Direct Red 227.

Examples of counterions in a salt of a/the compound represented by formula (m-B) (B is a number from 1 to 3) include the hydrogen ion (proton), lithium, sodium, potassium, and ammonium, and the salt may have counterions of the same species or different counterions at its relevant groups. A/The compound represented by formula (m-B) or its salt is a magenta or substantially magenta dye. "A/The compound represented by formula (m-B) or its salt" may hereinafter be referred to simply as "an (m-B) dye."

The magenta or substantially magenta dye may be selected from C.I. Direct Red 1, 4, 9, 80, 81, and 225 and C.I. Acid Red 52, 80, 82, 249, 254, and 289, but it is preferred to use any of the above-listed preferred dyes as primary dye(s).

The ink set according to this embodiment may include pigment ink(s), a first dye ink, a second dye ink that is a cyan ink as described above, and a second dye ink that is a magenta ink as described above. In such a configuration of the ink set, the dispersion stability of the pigment ink(s) is unlikely to be interfered with even in the event the pigment ink(s) and any of the dye inks come into contact.

1.4. Characteristics of the Inks and Other Information

The pigment ink(s), the first dye ink, and any second dye ink are attached to a recording medium, such as paper, film, or fabric, preferably by ink jet technology. It is therefore preferred to ensure that the viscosity of each ink is 1.5 mPa·s or more and 15.0 mPa·s or less, more preferably 1.5 mPa·s or more and 5.0 mPa·s or less, even more preferably 1.5 mPa·s or more and 3.6 mPa·s or less at 20° C. Attaching the inks to a recording medium by ink jet technology is an easy way to form a predetermined image efficiently.

The pigment ink(s), the first dye ink, and any second dye ink preferably have a surface tension at 25.0° C. of 40.0 mN/m or less, preferably 38.0 mN/m or less, more preferably 35.0 mN/m or less, even more preferably 30.0 mN/m or less. This ensures moderate wetting and spread on a recording medium. As for measurement, the surface tension can be measured by wetting a platinum plate with the composition and checking the surface tension under 25.0° C. conditions using CBVP-Z automated surface tensiometer (trade name, Kyowa Interface Science Co., Ltd.).

2. Examples and Comparative Examples

The following describes an aspect of the present disclosure in detail by providing examples, but no aspect of the disclosure is limited to these Examples. In the following, "parts" and "%" are by mass unless stated otherwise.

2.1. Preparation of Dye Inks and Pigment Inks

Yellow dye inks Y1 to Y15 having different formulae were prepared according to the formulae presented in Table 1, magenta dye inks M1 to M7 having different formulae were prepared according to the formulae presented in Table 2, cyan dye inks C1 to C10 having different formulae were prepared according to the formulae presented in Table 3, and black pigment inks Bk1 and Bk2 having different formulae were prepared according to the formulae presented in Table 4. Each ink was prepared by putting its ingredients, specified in any of Tables 1 to 4, into a container, mixing the ingredients by stirring them for 2 hours with a magnetic stirrer, and then filtering the mixture through a 5-μm membrane filter to remove impurities, such as dust and coarse particles. The values in Tables 1 to 4 are all in % by mass, and the purified water was added to make the total mass of the ink 100%.

TABLE 1

| | | Yellow | | | | | | | |
|---|---|---|---|---|---|---|---|---|---|
| | Name | Y-1 | Y-2 | Y-3 | Y-4 | Y-5 | Y-6 | Y-7 | Y-8 |
| Yellow dye(s) | (y-1) | 4.0 | 3.6 | 2.4 | 2.4 | 2.4 | 2.4 | 2.4 | 2.4 |
| | (y-2) | | | | 1.6 | | | | 0.8 |
| | (y-3) | | 0.4 | 1.6 | | | | | 0.8 |
| | (y-4) | | | | | 1.6 | | | |
| | (y-5) | | | | | | | | |
| | DY86 | | | | | | 1.6 | | |
| | DY132 | | | | | | | 1.6 | |
| Surfactants | Surfynol 104PG50 | 0.2 | 0.2 | 0.2 | 0.2 | 0.2 | 0.2 | 0.2 | 0.2 |
| | OLFINE E1010 | 0.3 | 0.3 | 0.3 | 0.3 | 0.3 | 0.3 | 0.3 | 0.3 |
| Organic solvents | Triethylene glycol | 10.0 | 10.0 | 10.0 | 10.0 | 10.0 | 10.0 | 10.0 | 10.0 |
| | Triethylene glycol monobutyl ether | 7.0 | 7.0 | 7.0 | 7.0 | 7.0 | 7.0 | 7.0 | 7.0 |
| | Glycerol | 10.0 | 10.0 | 10.0 | 10.0 | 10.0 | 10.0 | 10.0 | 10.0 |
| Others | Triethanolamine | 0.5 | 0.5 | 0.5 | 0.5 | 0.5 | 0.5 | 0.5 | 0.5 |
| | PROXEL | 0.1 | 0.1 | 0.1 | 0.1 | 0.1 | 0.1 | 0.1 | 0.1 |
| | EDTA | 0.02 | 0.02 | 0.02 | 0.02 | 0.02 | 0.02 | 0.02 | 0.02 |
| | Purified water | Balance | Balance | Balance | Balance | Balance | Balance | Balance | Balance |
| Ionic concentration | Li/Na/K total | 3200 | 3200 | 3250 | 5550 | 3000 | 6000 | 6000 | 3100 |
| Grades of the ink | Ozone resistance | A | A | A | A | B | B | B | A |
| | Light fastness | A | A | A | B | B | C | C | A |
| | Moisture resistance | A | A | A | A | B | B | B | A |
| | Printing-paper OD | C | B | A | B | B | B | B | B |
| | Clogging potential | B | B | C | C | A | A | A | B |
| | Solubility | A | A | A | A | A | A | A | A |

| | | Yellow | | | | | |
|---|---|---|---|---|---|---|---|
| | Name | Y-9 | Y-10 | Y-11 | Y-12 | Y-13 | Y-14 | Y-15 |
| Yellow dye(s) | (y-1) | | 4.0 | | | | | |
| | (y-2) | | | | | 4.0 | | |
| | (y-3) | | | 4.0 | 2.0 | | | |
| | (y-4) | | | | | | | |
| | (y-5) | | | | | | | 4.0 |
| | DY86 | | | | | | 4.0 | |
| | DY132 | | | | | | | 4.0 |

TABLE 1-continued

|  |  |  |  |  |  |  |  |  |
|---|---|---|---|---|---|---|---|---|
| Surfactants | Surfynol 104PG50 | 0.2 | 0.2 | 0.2 | 0.2 | 0.2 | 0.2 | 0.2 |
|  | OLFINE E1010 | 0.3 | 0.3 | 0.3 | 0.3 | 0.3 | 0.3 | 0.3 |
| Organic solvents | Triethylene glycol | 10.0 | 10.0 | 10.0 | 10.0 | 10.0 | 10.0 | 10.0 |
|  | Triethylene glycol monobutyl ether | 5.0 | 7.0 | 7.0 | 7.0 | 7.0 | 7.0 | 7.0 |
|  | Glycerol | 10.0 | 10.0 | 10.0 | 10.0 | 10.0 | 10.0 | 10.0 |
| Others | Triethanolamine | 0.5 | 0.5 | 0.5 | 0.5 | 0.5 | 0.5 | 0.5 |
|  | PROXEL | 0.1 | 0.1 | 0.1 | 0.1 | 0.1 | 0.1 | 0.1 |
|  | EDTA | 0.02 | 0.02 | 0.02 | 0.02 | 0.02 | 0.02 | 0.02 |
|  | Purified water | Balance | Balance | Balance | Balance | Balance | Balance | Balance |
| Ionic concentration | Li/Na/K total | 3200 | 3300 | 1650 | 9100 | 2600 | 2850 | 2000 |
| Grades of the ink | Ozone resistance | A | A | A | A | D | D | A |
|  | Light fastness | A | A | C | B | D | D | A |
|  | Moisture resistance | A | A | A | A | D | D | A |
|  | Printing-paper OD | C | A | D | A | A | A | C |
|  | Clogging potential | B | D | B | D | A | A | D |
|  | Solubility | C | A | A | A | A | A | A |

TABLE 2

|  |  | Magenta | | | | | | |
|---|---|---|---|---|---|---|---|---|
|  | Name | M-1 | M-2 | M-3 | M-4 | M-5 | M-6 | M-7 |
| Magenta dye | (m-1) | 4.0 | | | | | | |
|  | RR141 | | 4.0 | | | | | |
|  | AR249 | | | 4.0 | | | | |
|  | AR289 | | | | 4.0 | | | |
|  | DR227 | | | | | 4.0 | | |
|  | (m-2) | | | | | | 4.0 | |
|  | (m-3) | | | | | | | 4.0 |
| Surfactants | Surfynol 104PG50 | 0.2 | 0.2 | 0.2 | 0.2 | 0.2 | 0.2 | 0.2 |
|  | OLFINE E1010 | 0.3 | 0.3 | 0.3 | 0.3 | 0.3 | 0.3 | 0.3 |
| Organic solvents | Triethylene glycol | 10.0 | 10.0 | 10.0 | 10.0 | 10.0 | 10.0 | 10.0 |
|  | Triethylene glycol monobutyl ether | 7.0 | 7.0 | 7.0 | 7.0 | 7.0 | 7.0 | 7.0 |
|  | Glycerol | 10.0 | 10.0 | 10.0 | 10.0 | 10.0 | 10.0 | 10.0 |
| Others | Triethanolamine | 0.5 | 0.5 | 0.5 | 0.5 | 0.5 | 0.5 | 0.5 |
|  | PROXEL | 0.1 | 0.1 | 0.1 | 0.1 | 0.1 | 0.1 | 0.1 |
|  | EDTA | 0.02 | 0.02 | 0.02 | 0.02 | 0.02 | 0.02 | 0.02 |
|  | Purified water | Balance | Balance | Balance | Balance | Balance | Balance | Balance |
| Ionic concentration | Li/Na/K total | 4450 | 4700 | 2500 | 560 | 3400 | 800 | 4500 |
| Grades of the ink | Ozone resistance | A | B | C | A | C | A | A |
|  | Light fastness | A | B | B | B | C | A | A |
|  | Moisture resistance | A | A | B | B | B | B | B |
|  | Printing-paper OD | B | A | B | B | A | A | B |
|  | Clogging potential | A | A | A | B | A | A | A |
|  | Solubility | A | A | A | A | A | A | A |

TABLE 3

|  |  | Cyan | | | | | | | | | |
|---|---|---|---|---|---|---|---|---|---|---|---|
|  | Name | C-1 | C-2 | C-3 | C-4 | C-5 | C-6 | C-7 | C-8 | C-9 | C-10 |
| Cyan dye | (c-1) | 4.0 | | | | | | | | | |
|  | (c-2) | | 4.0 | | | | | | | | |
|  | (c-3) | | | 4.0 | | | | | | | |
|  | (c-4) | | | | 4.0 | | | | | | |
|  | (c-5) | | | | | 4.0 | | | | | |
|  | (c-6) | | | | | | 4.0 | | | | |
|  | (c-7) | | | | | | | 4.0 | | | |
|  | (c-8) | | | | | | | | 4.0 | | |
|  | (c-9) | | | | | | | | | 4.0 | |
|  | DB199 | | | | | | | | | | 4.0 |
| Surfactants | Surfynol 104PG50 | 0.2 | 0.2 | 0.2 | 0.2 | 0.2 | 0.2 | 0.2 | 0.2 | 0.2 | 0.2 |
|  | OLFINE E1010 | 0.3 | 0.3 | 0.3 | 0.3 | 0.3 | 0.3 | 0.3 | 0.3 | 0.3 | 0.3 |
| Organic solvents | Triethylene glycol | 10.0 | 10.0 | 10.0 | 10.0 | 10.0 | 10.0 | 10.0 | 10.0 | 10.0 | 10.0 |
|  | Triethylene glycol monobutyl ether | 7.0 | 7.0 | 7.0 | 7.0 | 7.0 | 7.0 | 7.0 | 7.0 | 7.0 | 7.0 |
|  | Glycerol | 10.0 | 10.0 | 10.0 | 10.0 | 10.0 | 10.0 | 10.0 | 10.0 | 10.0 | 10.0 |

TABLE 3-continued

|  | Name | Cyan | | | | | | | | | |
|---|---|---|---|---|---|---|---|---|---|---|---|
|  |  | C-1 | C-2 | C-3 | C-4 | C-5 | C-6 | C-7 | C-8 | C-9 | C-10 |
| Others | Triethanolamine | 0.5 | 0.5 | 0.5 | 0.5 | 0.5 | 0.5 | 0.5 | 0.5 | 0.5 | 0.5 |
|  | PROXEL | 0.1 | 0.1 | 0.1 | 0.1 | 0.1 | 0.1 | 0.1 | 0.1 | 0.1 | 0.1 |
|  | EDTA | 0.02 | 0.02 | 0.02 | 0.02 | 0.02 | 0.02 | 0.02 | 0.02 | 0.02 | 0.02 |
|  | Purified water | Balance | Balance | Balance | Balance | Balance | Balance | Balance | Balance | Balance | Balance |
| Ionic concentration | Li/Na/K total | 640 | 670 | 640 | 860 | 700 | 750 | 650 | 600 | 700 | 860 |
| Grades of the ink | Ozone resistance | B | A | B | A | B | A | B | C | B | C |
|  | Light fastness | A | A | A | A | A | A | A | A | A | A |
|  | Moisture resistance | A | A | A | A | A | A | A | A | A | A |
|  | Printing-paper OD | A | B | A | B | A | A | A | A | B | A |
|  | Clogging potential | A | A | A | A | A | A | A | A | A | A |
|  | Solubility | A | A | A | B | A | A | A | A | A | A |

TABLE 4

|  | Name | Black | |
|---|---|---|---|
|  |  | Bk-1 | Bk-2 |
| Black pigment | Carbon black | 4.0 | 4.0 |
| Surfactants | Surfynol 104PG50 | 0.2 | 0.2 |
|  | OLFINE E1010 | 0.3 | 0.3 |
| Organic solvents | Triethylene glycol | 10.0 | 10.0 |
|  | Triethylene glycol monobutyl ether | 7.0 | 7.0 |
|  | Glycerol | 10.0 | 10.0 |
| Resin | Resin emulsion | 0.0 | 2.0 |
| Others | Triethanolamine | 0.5 | 0.5 |
|  | PROXEL | 0.1 | 0.1 |

Tables 1 to 4 include the total Li/Na/K concentration of each ink. The ionic concentration of each ink was measured using Shimadzu Corporation's ion chromatograph under the following conditions:

Column: Shimadzu Corporation's ion-exchange resin (Shim-pack IC-C4)

Mobile phase: An oxalic acid solution (2.5 mmol/L)
Flow rate: 1.0 mL/min
Injection volume: 50 μL
Column temperature: 40° C.
Suppressor: Electrodialytic
Detector: An electrical conductivity detector (30° C.)

The ionic concentrations in the tables are in ppm.

Major ingredients in Tables 1 to 4 were as follows.

(y-1) to (y-4): (y-1) to (y-4) dyes as described above. (y-1), (y-3), and (y-4) were sodium salts, and (y-2) was a sodium and potassium salt.

(y-5) was the compound represented by formula (y-5) below.

[Chem. 35]

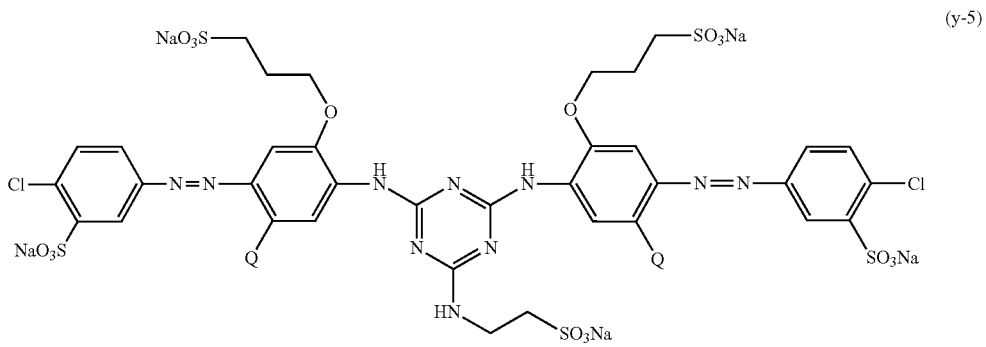

(y-5)

TABLE 4-continued

|  | Name | Black | |
|---|---|---|---|
|  |  | Bk-1 | Bk-2 |
|  | EDTA | 0.02 | 0.02 |
|  | Purified water | Balance | Balance |
| Ionic concentration | Li/Na/K total | 1000 | 1000 |

DY86: C.I. Direct Yellow 86
DY132: C.I. Direct Yellow 132

(m-1) to (m-3): (m-1) to (m-3) dyes as described above. (m-1) was a sodium salt, and (m-2) was a lithium and sodium salt.

(m-3) was a compound that satisfied the following:

(In formula (m-3), $R^1$, $R^3$, $R^5$, $R^6$, $R^8$, and $R^{10}$ represent methyl groups. $R^2$ and $R^7$ represent groups represented by formula (m-3') and having n-Pr or n-Bu as $R^{11}$, and $R^4$ and $R^9$ represent hydrogen atoms. Z represents a —$SO_3H$ group. n represents 2, and Z is in place of the hydrogen atoms in positions 2 and 7 of the xanthene structure.)

RR141: C.I. Reactive Red 141
AR249: C.I. Acid Red 249
AR289: C.I. Acid Red 289
DR227: C.I. Direct Red 227

(c-1) to (c-9): (c-1) to (c-9) dyes as described above. (c-1) to (c-3) were lithium and sodium salts, and (c-4) to (c-9) were sodium salts.

(c-3) was a compound that satisfied the following:

(In formula (c-3), $0 \leq b \leq 4$, $0 \leq c \leq 4$, and $1 \leq (b+c) \leq 4$, where b+c represents an integer; and rings $A^1$, $A^2$, and $A^3$ are each selected from a benzene ring, a 2,3-pyridine ring, and a 3,2-pyridine ring, with at least one of rings $A^1$, $A^2$, and $A^3$ being a 2,3-pyridine ring or 3,2-pyridine ring, and rings $A^1$, $A^2$, and $A^3$ may be the same or different.)

(c-5) was a compound that satisfied the following:

(In formula (c-5), rings $A^1$, $A^2$, and $A^3$ are each independently a 2,3-pyridine ring and/or a 3,2-pyridine ring, a is 1.0, b is 1.8, c is 1.2, and a, b, and c are averages across a mixture. $R^1$ is represented by $-C_6H_{12}-$)

(c-6) was a compound that satisfied the following:

(In formula (c-6), ring A is a 2,3-pyrido group, rings B, C, and D are benzo groups, and E is an ethylene group. X is a 2,5-disulfoanilino group, and Y is an amino group. a is 0, b is 2, and c is 1.)

(c-7) was a compound that satisfied the following:

(In formula (c-7), ring A is a 2,3-pyrido group, rings B, C, and D are benzo groups, $R^1$ represents a methyl group, $R^2$ represents an ethylene group, X is a 2,5-disulfoanilino group, m is approximately 2.8, n is approximately 0.2, and m+n is approximately 3.0.)

(c-8) was a compound that satisfied the following:

(In formula (c-8), $R^1$, $R^3$, $R^5$, $R^{11}$, $R^{13}$, and $R^{15}$ represent methyl groups, $R^2$ and $R^{12}$ represent an $-$NHCOiPr or $-$NHCOC$_3$H$_6$COOH group, $R^4$, $R^6$, $R^7$, $R^8$, $R^9$, $R^{10}$, $R^{14}$, $R^{16}$, $R^{17}$, $R^{18}$, $R^{19}$, $R^{20}$, $R^{21}$, $R^{23}$, and $R^{24}$ represent hydrogen atoms, and $R^{22}$ represents a $-$SO$_3$H group.)

(c-9) was a compound that satisfied the following:

(In formula (c-9), $R^1$, $R^2$, $R^3$, and $R^4$ represent $-(CH_2)_3SO_3H$ groups, and w, x, y, and z represent 1.)

DB199: C.I. Direct Blue 199

Surfynol 104PG50: (trade name, Air Products and Chemicals): An acetylene glycol surfactant OLFINE E1010: (trade name, Nissin Chemical Industry): An acetylene glycol surfactant PROXEL: PROXEL XL2: (trade name, Lonza): An antimold/preservative EDTA: Disodium ethylenediaminetetraacetate (reagent): A chelating agent Resin emulsion: A styrene-acrylic acid copolymer (Tg, 80° C.; weight-average molecular weight, 290000; BASF Japan)

2.2. Testing 2.2.1. Resistance to Ozone of the Dye Inks

In each Example or Comparative Example, the ink set, specified in Table 5, was loaded into an ink jet printer (trade name "EW-M660FT," Seiko Epson Corporation), and a solid pattern of the inks' colors was recorded on a recording medium (photographic paper (glossy), product model "EPSON Premium Glossy Photo Paper," Seiko Epson Corporation). The resulting image was used as a test sample.

Using OMS-L Ozone Weather Meter (trade name, Suga Test Instruments Co., Ltd.), the test sample was exposed to ozone for a predetermined period of time under the conditions of a temperature of 23° C., a humidity of 50% RH, and an ozone concentration of 5 ppm.

Before and after the exposure to ozone, the OD of the recorded image on the sample was measured using a colorimeter (trade name "Xrite i1," Xrite). The measurement of the OD was performed using a D50 light source, an angle of view of 2°, and red, green, and blue filters for cyan, magenta, and yellow images, respectively. The black ink (pigment ink) was not tested.

The relict optical density (ROD) of the image on the exposed test sample was determined from the measurements (OD), and the determined ROD was used to evaluate resistance to ozone. The calculation of the ROD is as in "ROD (%)=(Dn/Do)×100 (where Dn is the OD of the images after the end of the exposure, and Do is the OD of the images before the start of the exposure)."

Ozone resistance was graded according to the evaluation criteria below based on RODs at four points with ODs of close to the maximum (2.0), 1.5, 1.0, and 0.5. The test results are presented in Tables 1 to 4.

A: The ROD does not decrease to 70% within 80 hours.
B: The ROD does not decrease to 70% within 40 hours.
C: The ROD does not decrease to 70% within 16 hours.
D: The ROD decreases to 70% within 16 hours.

2.2.2. Light Fastness of the Dye Inks

A test sample obtained in the same way as in the ozone resistance test was exposed to light using a xenon weather meter (trade name, XL75S; Suga Test Instruments Co., Ltd.) under the conditions of a temperature of 23° C., a humidity of 50% RH, and an illuminance of 75 klux.

Then measurement similar to that in the ozone resistance test was performed using a colorimeter (trade name "Xrite i1," Xrite), and light fastness was graded according to the evaluation criteria below based on RODs at four points with ODs of close to the maximum (2.0), 1.5, 1.0, and 0.5. The test results are presented in Tables 1 to 4.

A: The ROD does not decrease to 70% before 50000 klx·h.
B: The ROD does not decrease to 70% before 30000 klx·h.
C: The ROD does not decrease to 70% before 20000 klx·h.
D: The ROD decreases to 70% before 20000 klx·h.

2.2.3. Moisture Resistance of the Dye Inks

The aforementioned ink jet printer (trade name "EW-M660FT," Seiko Epson Corporation) was used to print letters in the colors of the inks, i.e., cyan, magenta, yellow, and black, white letters on colored background (white letters formed on solid images in each color), and a natural graphic on a recording medium (photographic paper (glossy), product model "EPSON Premium Glossy Photo Paper," Seiko Epson Corporation) under 40° C. and 85% RH conditions. The resulting images were dried for 24 hours under 24° C. and 50% RH conditions. Then the images were placed under 35° C. and 85% RH conditions, protected from light. After the images were left there for 4 days, the printed letters and the white letters on colored background were inspected for bleeding. Moisture resistance was graded according to the following criteria.

A: No bleed is observed in visual inspection or even under an optical microscope.

B: No bleed is visible to the eyes, but some bleed is observed under an optical microscope.

C: -

D: Bleed is observed in visual inspection, with printed letters thickening and/or white letters on colored background stained.

2.2.4. Color Strength on Printing Paper (Printing-Paper OD) of the Dye Inks

A test sample was obtained and subjected to the measurement of OD in the same way as in the ozone resistance test, and the measured OD was used to evaluate color strength. The sample was patterns printed on printing paper (Xerox 4200, trade name; Fuji Xerox) using an ink jet printer (trade name "EW-M660FT," Seiko Epson Corporation). For the patterns printed in primary/secondary colors, the OD and Lab were measured, and the gamut volume was calculated. The printing conditions were 25° C. and 40% RH, and the measuring instrument was the same as in the above tests. Color strength was graded according to the evaluation criteria below. The test results are presented in Tables 1 to 4.
- A: The OD is 2.0 or more.
- B: The OD is 1.9 or more and less than 2.0.
- C: The OD is 1.8 or more and less than 1.9.
- D: The OD is less than 1.8.

2.2.5. Potential for Causing Clogging of the Dye Inks

With each of the dye inks in Tables 1 to 3 and pigment ink Bk-1 in Table 4, an ink jet printer (trade name "EW-M660FT," Seiko Epson Corporation) was operated to print a nozzle check pattern at 25° C. and 40% RH. All nozzles ejected ink normally. The head was cleaned once, and the printer was left at room temperature for 30 minutes. A nozzle check pattern was printed once again and checked for nonejecting nozzles. This series of operations was repeated three times, and the number of nonejecting nozzles was averaged across the three runs. The potential for causing clogging was graded according to the criteria below. It should be noted that the printer's head cleaning operation involves wiping, i.e., rubbing the nozzle surface with a wiper, and therefore causes the pigment and dye inks to be mixed. The evaluation criteria are as follows, and the test results are presented in Tables 1 to 3.

Acceptance Criteria
- A: The success rate is 90% or more.
- B: The success rate is 80% or more and less than 90%.
- C: The success rate is 70% or more and less than 80%.
- D: The success rate is less than 70%.

2.2.6. Solubility of the Dye Inks

The solubility of each dye ink was evaluated as follows. That is, one drop of the prepared yellow, magenta, or cyan ink was placed on a microscope slide using a dropper, covered with a coverslip, and left under 40° C. conditions for 1 day. The ink drop was then observed under a microscope for separation of solids, and stability in solution was graded according to the acceptance criteria below.
- A: No solids have formed.
- B: Solids have formed at the edges of the coverslip.
- C: Solids have reached the middle of the coverslip.

2.2.7. Resistance to Ozone of the Ink Sets

The resistance to ozone of each ink set was graded based on the ozone resistance grade of each constituting color according to the evaluation criteria below. The results are presented in Table 5.
- A: The ozone resistance grade is A for all three colors.
- B: The ozone resistance grade is B for one or more of the three colors.
- C: The ozone resistance grade is C for one or more of the three colors.
- D: The ozone resistance grade is D for one or more of the three colors.

2.2.8. Light Fastness of the Ink Sets

The light fastness of each ink set was graded based on the light fastness grade of each constituting color according to the evaluation criteria below. The results are presented in Table 5.
- A: The light fastness grade is A for all three colors.
- B: The light fastness grade is B for one or more of the three colors.
- C: The light fastness grade is C for one or more of the three colors.
- D: The light fastness grade is D for one or more of the three colors.

2.2.9. Moisture Resistance of the Ink Sets

The moisture resistance of each ink set was graded based on the moisture resistance grade of each constituting color according to the evaluation criteria below. The results are presented in Table 5.
- A: The moisture resistance grade is A for all three colors.
- B: The moisture resistance grade is B for one or more of the three colors.
- C: The moisture resistance grade is C for one or more of the three colors.
- D: The moisture resistance grade is D for one or more of the three colors.

2.2.10. Gamut Colorfulness of the Ink Sets

Gamut colorfulness was graded based on the gamut volume determined in the evaluation of color strength on printing paper (printing-paper OD) according to the criteria below. The results are presented in Table 5.
- A: The gamut volume is 160000 or more.
- B: The gamut volume is 155000 or more and less than 160000.
- C: The gamut volume is 150000 or more and less than 155000.
- D: The gamut volume is less than 150000.

2.2.11. Potential for Causing Clogging of the Ink Sets

With each of the dye inks in Tables 1 to 3 and pigment ink Bk-1 in Table 4, an ink jet printer (trade name "EW-M660FT," Seiko Epson Corporation) was operated to print a nozzle check pattern at 25° C. and 40% RH. All nozzles ejected ink normally. The head was cleaned once, and the printer was left at room temperature for 30 minutes. A nozzle check pattern was printed once again and checked for nonejecting nozzles. This series of operations was repeated three times, and the number of nonejecting nozzles was averaged across the three runs. The potential for causing clogging was graded according to the criteria below. It should be noted that the printer's head cleaning operation involves wiping, i.e., rubbing the nozzle surface with a wiper, and therefore causes the pigment and dye inks to be mixed. The evaluation criteria are as follows, and the test results are presented in Table 5.
- A: The success rate is 90% or more.
- B: The success rate is 80% or more and less than 90%.
- C: The success rate is 70% or more and less than 80%.
- D: The success rate is less than 70%.

TABLE 5

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Ink set | Black | Bk-1 | Bk-1 | Bk-1 | Bk-1 | Bk-1 | Bk-1 | Bk-1 | Bk-1 | Bk-1 | Bk-1 | Bk-1 |
|  | Cyan | C-1 | C-1 | C-1 | C-1 | C-1 | C-1 | C-1 | C-1 | C-1 | C-2 | C-3 |
|  | Magenta | M-1 | M-1 | M-1 | M-1 | M-1 | M-1 | M-1 | M-1 | M-1 | M-1 | M-1 |
|  | Yellow | Y-1 | Y-2 | Y-3 | Y-4 | Y-5 | Y-6 | Y-7 | Y-8 | Y-9 | Y-3 | Y-3 |

TABLE 5-continued

| Grades of the ink set | | | | | | | | | | | | |
|---|---|---|---|---|---|---|---|---|---|---|---|---|
| | Ozone resistance | B | B | B | B | B | B | B | B | B | A | B |
| | Light fastness | A | A | A | B | B | C | C | A | A | A | A |
| | Moisture resistance | A | A | A | A | B | B | B | A | A | A | A |
| | Gamut colorfulness | C | B | B | B | B | B | B | B | C | B | B |
| | Clogging potential | B | B | C | C | A | A | A | B | B | C | C |

| | | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| Ink set | Black | Bk-1 | Bk-1 | Bk-1 | Bk-1 | Bk-1 | Bk-1 | Bk-1 | Bk-1 | Bk-1 | Bk-1 | Bk-1 |
| | Cyan | C-4 | C-5 | C-6 | C-7 | C-8 | C-9 | C-10 | C-1 | C-1 | C-1 | C-1 |
| | Magenta | M-1 | M-1 | M-1 | M-1 | M-1 | M-1 | M-1 | M-2 | M-3 | M-4 | M-5 |
| | Yellow | Y-3 | Y-3 | Y-3 | Y-3 | Y-3 | Y-3 | Y-3 | Y-3 | Y-3 | Y-3 | Y-3 |
| Grades of the ink set | Ozone resistance | A | B | B | B | C | B | C | B | C | B | C |
| | Light fastness | A | A | A | A | A | A | A | B | B | B | B |
| | Moisture resistance | A | A | A | A | A | A | A | A | B | B | B |
| | Gamut colorfulness | B | B | B | B | B | B | B | A | B | B | B |
| | Clogging potential | C | C | C | C | C | C | C | C | C | C | C |

| | | Example 23 | Example 24 | Example 25 | Comparative Example 1 | Comparative Example 2 | Comparative Example 3 | Comparative Example 4 | Comparative Example 5 | Comparative Example 6 |
|---|---|---|---|---|---|---|---|---|---|---|
| Ink set | Black | Bk-1 | Bk-1 | Bk-2 | Bk-1 | Bk-1 | Bk-1 | Bk-1 | Bk-1 | Bk-1 |
| | Cyan | C-1 | C-1 | C-1 | C-1 | C-1 | C-1 | C-1 | C-1 | C-1 |
| | Magenta | M-6 | M-7 | M-1 | M-1 | M-1 | M-1 | M-1 | M-1 | M-1 |
| | Yellow | Y-3 | Y-3 | Y-3 | Y-10 | Y-11 | Y-12 | Y-13 | Y-14 | Y-15 |
| Grades of the ink set | Ozone resistance | B | B | B | B | B | B | B | B | B |
| | Light fastness | A | A | A | A | A | A | A | A | A |
| | Moisture resistance | B | B | A | A | A | A | A | A | A |
| | Gamut colorfulness | A | B | B | A | A | A | A | A | A |
| | Clogging potential | C | C | C | D | D | D | D | D | D |

2.3. Test Results

As shown in Table 5, the ink sets of Examples, each including a pigment ink and a dye ink containing a (y-1) dye, were given high grades in the potential for causing clogging. By contrast, the ink sets of Comparative Examples, in which no dye ink contained a (y-1) dye, were poor in the potential for causing clogging.

The present disclosure is not limited to the above embodiments, and many variations are possible. For example, the present disclosure embraces configurations substantially identical to those described in the embodiments (e.g., configurations identical in function, methodology, and results to or having the same goal and offering the same advantages as the described ones). The present disclosure also includes configurations created by changing any nonessential part of those described in the above embodiments. Furthermore, the present disclosure encompasses configurations identical in operation and effect to or capable of fulfilling the same purposes as those described in the above embodiments. Configurations obtained by adding any known technology to those described in the embodiments are also part of the present disclosure.

What is claimed is:

1. An ink set comprising:
   a pigment ink, containing a pigment; and
   a dye ink containing a compound represented by formula (y-1) below or a salt thereof.

[Chem. 1]

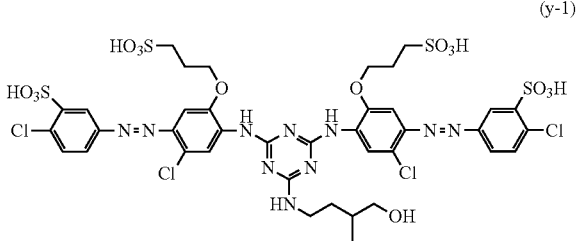

(y-1)

2. The ink set according to claim 1, wherein
   a percentage of the compound represented by formula (y-1) above or salt thereof in the dye ink is 60.0% by mass or more and 90.0% by mass or less of a total amount of dyes in the dye ink.

3. The ink set according to claim 1, wherein
   the dye ink further contains a compound represented by formula (y-2) below or a salt thereof.

[Chem. 2]

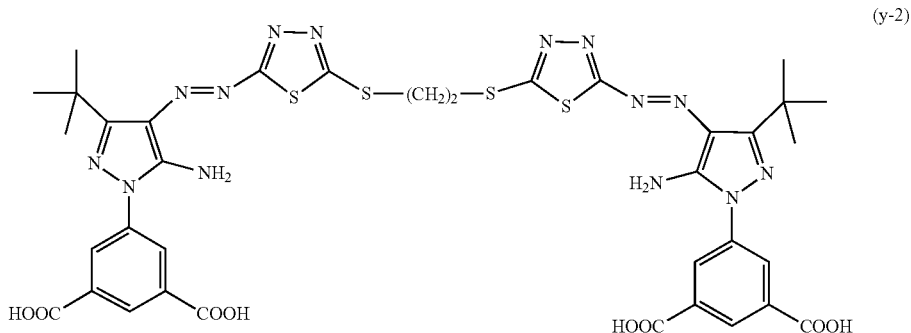

(y-2)

4. The ink set according to claim 1, wherein the dye ink further contains a compound represented by formula (y-3) below or a salt thereof.

[Chem. 3]

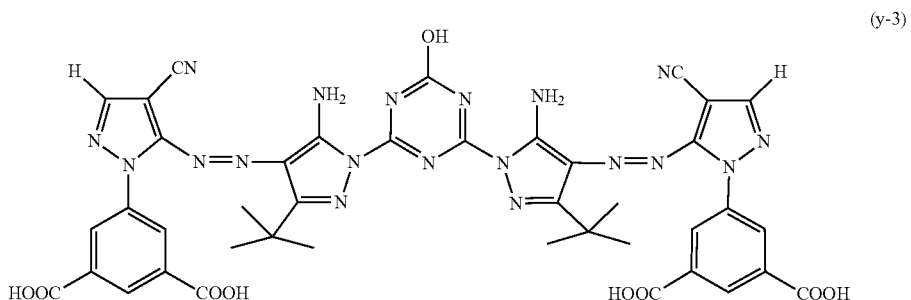

(y-3)

5. The ink set according to claim 1, wherein the dye ink further contains a compound represented by formula (y-4) below or a salt thereof.

[Chem. 4]

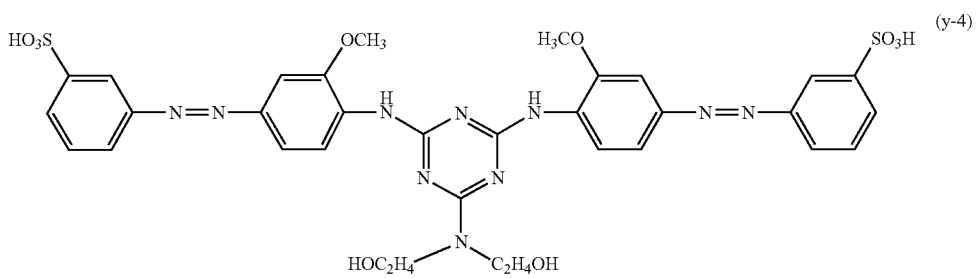

(y-4)

6. The ink set according to claim 1, wherein the dye ink further contains C.I. Direct Yellow 86.
7. The ink set according to claim 1, wherein the dye ink further contains C.I. Direct Yellow 132.
8. The ink set according to claim 1, wherein the dye ink contains an organic solvent having an sp of 12.5 or less in an amount of 5.0% by mass or more.
9. The ink set according to claim 1, further comprising: a cyan ink containing one or two or more selected from:
   a compound represented by formula (c-1) below or a salt thereof;

[Chem. 5]

(c-1)

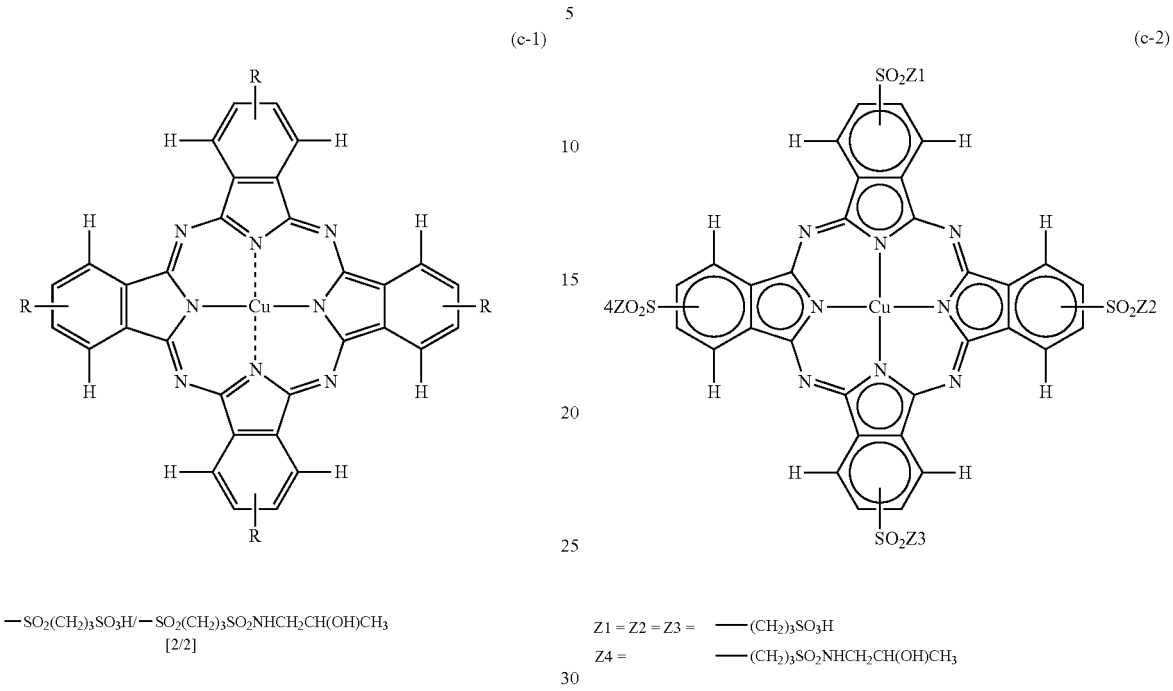

R = —SO₂(CH₂)₃SO₃H/—SO₂(CH₂)₃SO₂NHCH₂CH(OH)CH₃
[2/2]

a compound represented by formula (c-2) below or a salt thereof;

[Chem. 6]

(c-2)

Z1 = Z2 = Z3 = —(CH₂)₃SO₃H
Z4 = —(CH₂)₃SO₂NHCH₂CH(OH)CH₃ a compound represented by formula (c-3) below or a salt thereof,

[Chem. 7]

(c-3)

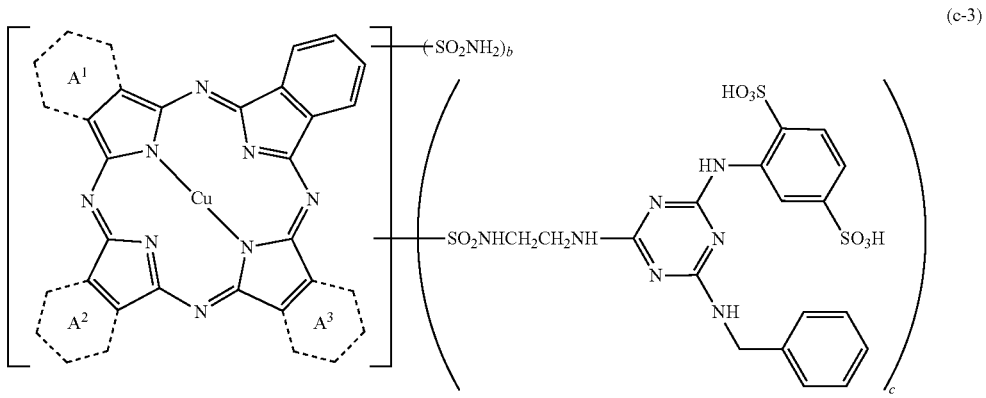

where $0 \leq b \leq 4$, $0 \leq c \leq 4$, and $1 \leq (b+c) \leq 4$, where b+c represents an integer; and rings $A^1$, $A^2$, and $A^3$ are each selected from a benzene ring, a 2,3-pyridine ring, and a 3,2-pyridine ring, with at least one of rings $A^1$, $A^2$, and $A^3$ being a 2,3-pyridine ring or 3,2-pyridine ring, and rings $A^1$, $A^2$, and $A^3$ may be the same or different;

a compound represented by formula (c-4) below or a salt thereof;

[Chem. 8]

(c-4)

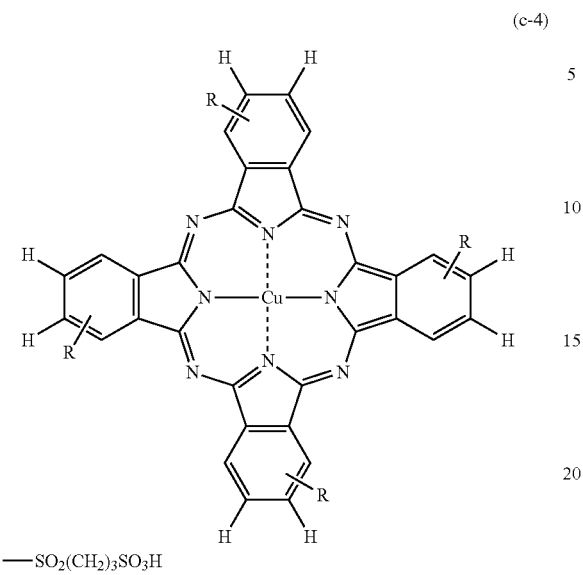

R = —SO$_2$(CH$_2$)$_3$SO$_3$H a compound represented by formula (c-5) below or a salt thereof,

[Chem. 9]

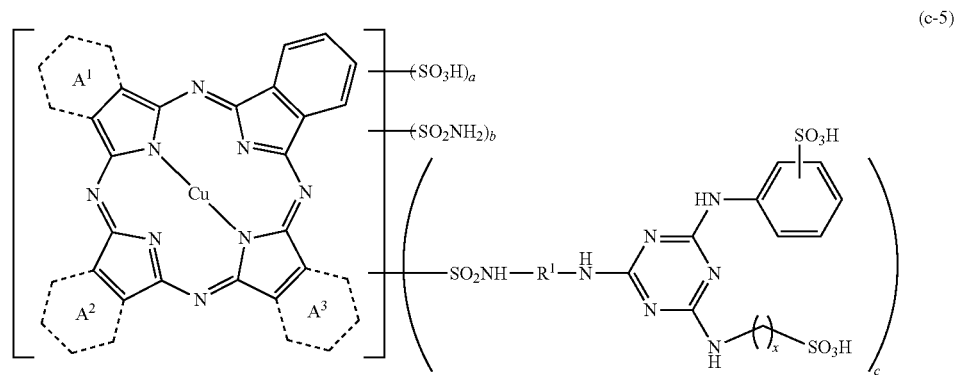

(c-5)

where rings A$^1$, A$^2$, and A$^3$ are each selected from a benzene ring, a 2,3-pyridine ring, and a 3,2-pyridine ring, with at least one of rings A$^1$, A$^2$, and A$^3$ being a 2,3-pyridine ring or 3,2-pyridine ring, and rings A$^1$, A$^2$, and A$^3$ may be the same or different; 1.0≤a≤3.0, 0.2≤b≤1.8, 0.8≤c≤1.6, and 0≤a+b+c≤4; 1≥x≤3, where x is an integer; and R$^1$ is a C1 to C6 linear alkylene group;

a compound represented by formula (c-6) below or a salt thereof,

[Chem. 10]

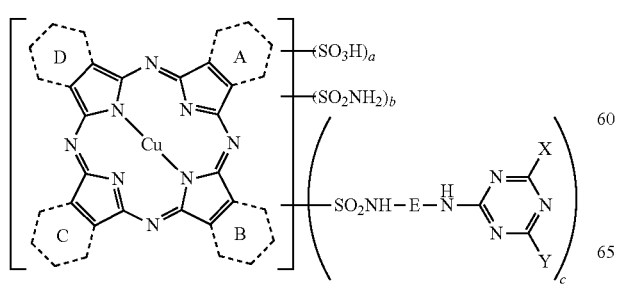

(c-6)

where rings A, B, C, and D are each independently an aromatic six-membered ring, with at least one of rings A, B, C, and D being a pyridine ring or pyrazine ring; E is an alkylene group; X is a sulfo-substituted anilino group, carboxy-substituted anilino group, or phosphono-substituted anilino group, and the substituted anilino group may further have one to four substituents selected from the group consisting of a sulfonic acid group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, a ureido group, an alkyl group, a nitro group, a cyano group, a halogen, an alkylsulfonyl group, and an alkylthio group; Y is a hydroxy group or amino group; and 0.0≤a≤2.0, 0.0≤b≤3.0, 0.1≤c≤3.0, and 1.0≤a+b+c≤4.0;

a compound represented by formula (c-7) below or a salt thereof,

[Chem. 11]

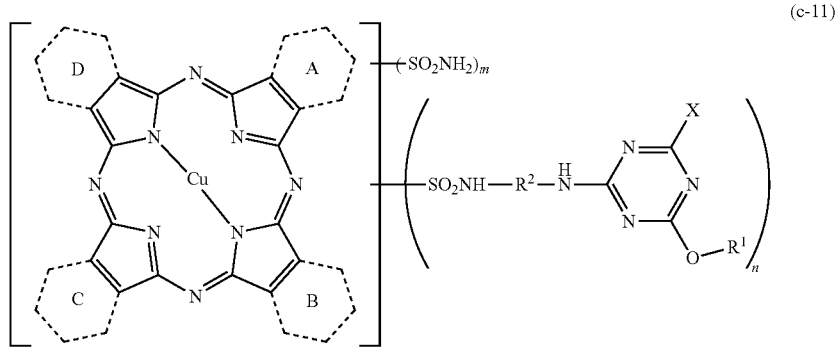

(c-11)

where rings A, B, C, and D each independently represent a benzene ring or nitrogen-containing heteroaromatic ring, with more than 0.0 and 3.0 or less of the four being a nitrogen-containing heteroaromatic ring or rings and rest being a benzene ring or rings; $R^1$ represents an alkyl group, $R^2$ represents an alkylene group, and X represents an anilino group having one or more sulfonic acid groups; X may further have a substituent selected from the group consisting of a carboxy group, a phosphoric acid group, a hydroxy group, an alkoxy group, an alkylcarbonylamino group, a ureido group, a nitro group, and a halogen atom; $0.0<m<3.9$, $0.1 \leq n<4.0$, and $1.0 \leq (m+n)<4.0$;

a compound represented by formula (c-8) below or a salt thereof,

[Chem. 12]

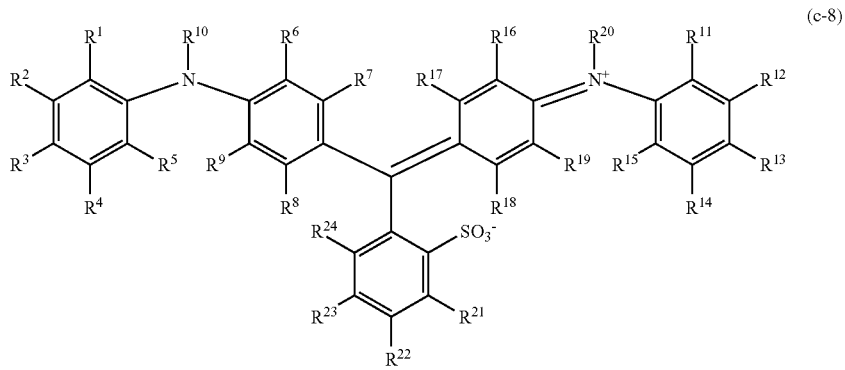

(c-8)

where $R^1$ to $R^{24}$ each independently represent a hydrogen atom, a halogen atom, an alkyl group, a cycloalkyl group, an alkenyl group, an alkynyl group, an aryl group, an aralkyl group, an acyl group, an acylamino group, a sulfonylamino group, an alkoxy group, an aryloxy group, a hydroxy group, an amino group, a nitro group, a cyano group, a sulfonic acid group, a carboxylic acid group, a sulfamoyl group, a carbamoyl group, an alkoxysulfonyl group, an alkoxycarbonyl group, an aryloxysulfonyl group, or an aryloxycarbonyl group and satisfy at least one of the following (X) and (Y): (X) at least one of $R^1$ to $R^{24}$ is a sulfonic acid group or carboxylic acid group; (Y) at least one of $R^6$, $R^7$, $R^8$, $R^9$, $R^{16}$, $R^{17}$, $R^{18}$, and $R^{19}$ is a halogen atom, acyl group, nitro group, or cyano group;

a compound represented by formula (c-9) below or a salt thereof,

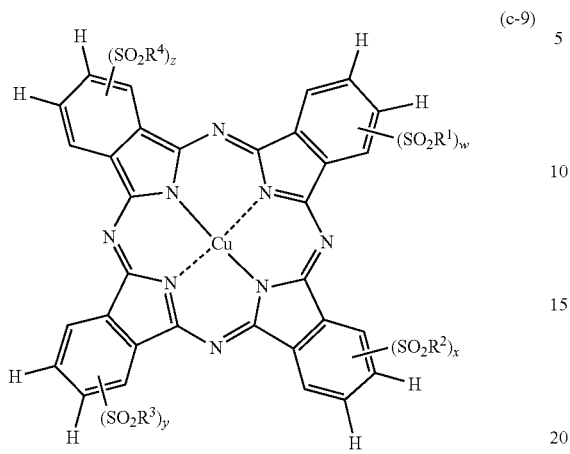

(c-9)

where $R^1$, $R^2$, $R^3$, and $R^4$ each independently represent an alkyl group, a cycloalkyl group, an alkenyl group, an aralkyl group, an aryl group, or a heterocyclic group, with at least one of $R^1$, $R^2$, $R^3$, and $R^4$ substituted with an ionic group; and w, x, y, and z each independently represent 1 or 2; and C.I. Direct Blue 199; and a magenta ink containing one or two or more selected from:

a compound represented by formula (m-1) below or a salt thereof;

[Chem. 14]

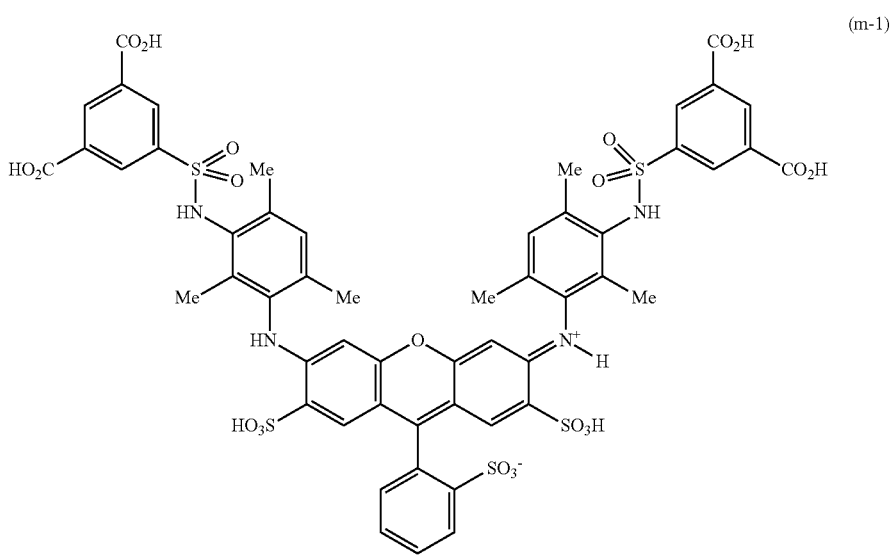

(m-1)

a compound represented by formula (m-2) below or a salt thereof;

[Chem. 15]

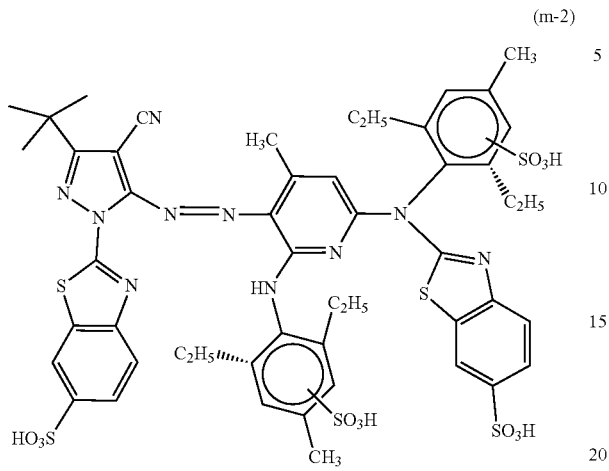

(m-2)

a compound represented by formula (m-3) below or a salt thereof;

[Chem. 16]

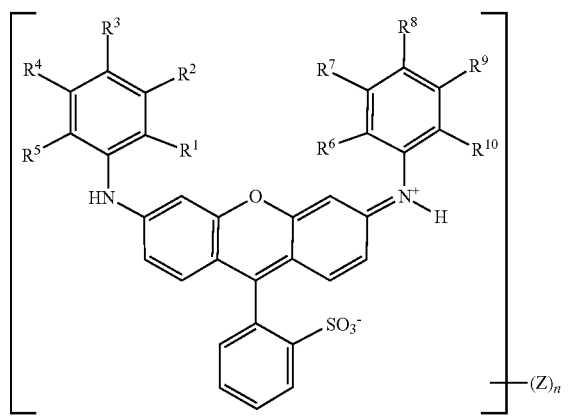

(m-3)

where $R^1$, $R^5$, $R^6$, and $R^{10}$ each independently represent an alkyl group; $R^3$ and $R^8$ each independently represent a hydrogen atom, an alkyl group, an alkoxy group, or an aryloxy group, and an alkyl group, an alkoxy group, and an aryloxy group may have at least one type of substituent selected from the group of types of substituents consisting of alkyl, aryl, arylalkyl, hydroxyl, carbamoyl, sulfamoyl, alkoxy, cyano, halogen, and ionic groups; $R^2$, $R^4$, $R^7$, and $R^9$ each independently represent a hydrogen atom or an acylamino group represented by formula (m-3') below, with at least one of $R^2$, $R^4$, $R^7$, and $R^9$ being an acylamino group represented by formula (m-3') below; Z represents a $SO_3H$ group, $SO_3M$ group, where M represents an ammonium ion or alkali metal ion, or sulfamoyl group; n represents an integer of 0 to 3 when at least one of $R^2$, $R^3$, $R^4$, $R^7$, $R^8$, and $R^9$ is substituted with an ionic group, and an integer of 1 to 3 when not, and Z, when present, is in place of at least one aromatic hydrogen atom,

[Chem. 17]

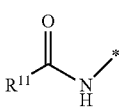

(m-3')

where $R^{11}$ represents an alkyl group, a cycloalkyl group, an aryl group, an arylalkyl group, an alkenyl group, or a heterocyclic group, and an alkyl group, a cycloalkyl group, an aryl group, an arylalkyl group, an alkenyl group, and a heterocyclic group may have at least one type of substituent selected from the group of types of substituents consisting of alkyl, aryl, arylalkyl, alkenyl, alkoxy, cyano, alkylamino, sulfoalkyl, carbamoyl, sulfamoyl, sulfonylamino, halogen, and ionic groups; and represents a site for binding with the aromatic ring or rings in formula (m-3); and C.I. Direct Red 227.

\* \* \* \* \*